US011880071B2

(12) United States Patent
Brusberg et al.

(10) Patent No.: US 11,880,071 B2
(45) Date of Patent: Jan. 23, 2024

(54) OPTICAL ASSEMBLY FOR INTERFACING WAVEGUIDE ARRAYS, AND ASSOCIATED METHODS

(71) Applicant: CORNING RESEARCH & DEVELOPMENT CORPORATION, Corning, NY (US)

(72) Inventors: Lars Martin Otfried Brusberg, Corning, NY (US); Douglas Llewellyn Butler, Painted Post, NY (US); David Francis Dawson-Elli, Charlotte, NC (US); James Scott Sutherland, Painted Post, NY (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 17/891,638

(22) Filed: Aug. 19, 2022

(65) Prior Publication Data

US 2023/0054219 A1     Feb. 23, 2023

Related U.S. Application Data

(60) Provisional application No. 63/235,862, filed on Aug. 23, 2021.

(51) Int. Cl.
*G02B 6/36*     (2006.01)

(52) U.S. Cl.
CPC ........... *G02B 6/368* (2013.01); *G02B 6/3636* (2013.01)

(58) Field of Classification Search
CPC .................................................. G02B 6/368
See application file for complete search history.

(56) References Cited

U.S. PATENT DOCUMENTS 3,503,666 A * 3/1970 Moore ............... G06K 7/10831
250/227.28
5,006,201 A * 4/1991 Kaukeinen ........... G02B 6/3636
216/24

(Continued)

FOREIGN PATENT DOCUMENTS

CN     102375177 A     3/2012
CN     203101677 U     7/2013
(Continued)

OTHER PUBLICATIONS

Djogo et al., "Femtosecond laser additive and subtractive microprocessing: enabling a high-channel density silica interposer for multicore fibre to silicon-photonic packaging", International Journal of Extreme Manufacturing, vol. 1, No. 4, 2019, 10 pages.

(Continued)

*Primary Examiner* — Chris H Chu
(74) *Attorney, Agent, or Firm* — Adam R. Weeks

(57) ABSTRACT

An optical assembly includes stacked first and second planar lightwave circuit (PLC) members each having a plurality of waveguides in respective first and second planes, to provide optical connections between a two-dimensional array and a one-dimensional array of external optical waveguides (e.g., optical fiber cores). Inner faces of first and second PLC members are arranged facing one another and with the first and second planes (corresponding to the pluralities of first and second waveguides, respectively) being non-parallel. An optical assembly may provide optical connections between arrays of cores having a different pitch to serve as a fanout interface. Methods for fabricating an optical assembly are further provided.

23 Claims, 15 Drawing Sheets

(56) References Cited

U.S. PATENT DOCUMENTS

| | | | |
|---|---|---|---|
| 5,109,460 A * | 4/1992 | Baek | B41J 2/46 355/1 |
| 5,742,720 A | 4/1998 | Kobayashi et al. | |
| 5,996,376 A | 12/1999 | Johnson et al. | |
| 6,157,756 A | 12/2000 | Ishiwata | |
| 6,826,347 B2 | 11/2004 | Matsumoto et al. | |
| 7,899,288 B2 | 3/2011 | Shimotsu | |
| 8,270,784 B2 | 9/2012 | Thomson et al. | |
| 8,548,291 B2 | 10/2013 | Doerr et al. | |
| 9,535,221 B2 | 1/2017 | Bradley | |
| 9,709,750 B1 | 7/2017 | Kuang et al. | |
| 9,753,221 B2 | 9/2017 | Baerenklau et al. | |
| 10,012,809 B2 | 7/2018 | Mentovich et al. | |
| 10,078,190 B2 | 9/2018 | Doerr et al. | |
| 10,481,325 B2 | 11/2019 | Cui et al. | |
| 10,866,081 B2 | 12/2020 | Nasilowski et al. | |
| 2003/0174961 A1 | 9/2003 | Hamada | |
| 2003/0180023 A1 | 9/2003 | Hamada | |
| 2008/0002936 A1 * | 1/2008 | Sun | G02B 6/3608 385/39 |
| 2008/0099430 A1 * | 5/2008 | Brooks | G02B 6/06 385/98 |
| 2014/0161396 A1 | 6/2014 | Feng et al. | |
| 2019/0346629 A1 | 11/2019 | Morishima | |
| 2021/0096302 A1 | 4/2021 | Butler et al. | |
| 2021/0373245 A1 * | 12/2021 | Butler | G02B 6/3636 |

FOREIGN PATENT DOCUMENTS

| | | |
|---|---|---|
| CN | 103885118 A | 6/2014 |
| CN | 102902024 B | 4/2015 |
| CN | 105589223 A | 5/2016 |
| CN | 106597612 B | 4/2017 |
| CN | 105467524 B | 7/2017 |
| CN | 206684343 U | 11/2017 |
| CN | 111323870 A | 6/2020 |
| CN | 111474641 A | 7/2020 |
| CN | 111766660 A | 10/2020 |
| EP | 0863417 A1 | 9/1998 |
| EP | 0974077 A2 | 1/2000 |
| EP | 1347318 B1 | 12/2010 |
| JP | 06-324221 A | 11/1994 |
| JP | 08-271767 A | 10/1996 |
| JP | 09-269436 A | 10/1997 |
| JP | 10-246838 A | 9/1998 |
| JP | 11-142676 A | 5/1999 |
| JP | 2000-066125 A | 3/2000 |
| JP | 2000-352639 A | 12/2000 |
| JP | 3256533 B2 | 2/2002 |
| JP | 2002-162538 A | 6/2002 |
| JP | 2003-043305 A | 2/2003 |
| JP | 2003-185871 A | 7/2003 |
| JP | 2003-270475 A | 9/2003 |
| JP | 2004-101989 A | 4/2004 |
| JP | 2004-325610 A | 11/2004 |
| JP | 3708838 B2 | 10/2005 |
| JP | 2011-237573 A | 11/2011 |
| JP | 2013-051656 A | 3/2013 |
| JP | 2013-057842 A | 3/2013 |
| JP | 5747384 B2 | 7/2015 |
| JP | 6013953 B2 | 10/2016 |
| JP | 2017-142275 A | 8/2017 |
| JP | 2018-124307 A | 8/2018 |
| JP | 2019-101152 A | 6/2019 |
| JP | 2019-131441 A | 8/2019 |
| JP | 2019-152804 A | 9/2019 |
| WO | 02/41055 A1 | 5/2002 |
| WO | 2013/051656 A1 | 4/2013 |
| WO | 2018/099575 A1 | 6/2018 |
| WO | 2018/135411 A1 | 7/2018 |
| WO | 2019/131441 A1 | 7/2019 |
| WO | 2020/017422 A1 | 1/2020 |

OTHER PUBLICATIONS

Dwivedi et al., "Multicore Fiber Link With SiN Integrated Fan-Out and InP Photodiode Array," in IEEE Photonics Technology Letters, vol. 30, No. 22, 2018, pp. 1921-1924.

Dwivedi, S., et al., "Multicore Fiber Link with SiN Integrated Fan-out and InP Photodiode Array", IEEE Photonics Technology Letters, 1-1, 2018, pp. 1-4.

Gligor Djogo, et al., "Femtosecond laser additive and subtractive micro-processing: enabling a high-channel-density silica interposer for multicore fibre to silicon-photonic packaging", International Journal of Extreme Manufacturing, vol. 1, No. 4, 2019, pp. 1-10.

Jean-Marc Fédéli, "Integrated Photonics: Materials, Devices, and Applications III", Proceedings of SPIE, vol. 9520, 2015, 9 pages.

Jian Liu, et al., "A two-dimensional dual-wavelength routing network with 1-to-10 cascaded fanouts", IEEE Photonics Technology Letters, vol. 10, No. 2, 1998, pp. 238-240.

Poulopoulos, G. N., et al., "SiN-assisted polarization-insensitive multicore fiber to silicon photonics interface", Integrated Photonics: Materials, Devices, and Applications III, Proc. of SPIE vol. 9520, 95200E, 2015, pp. 1-16.

* cited by examiner

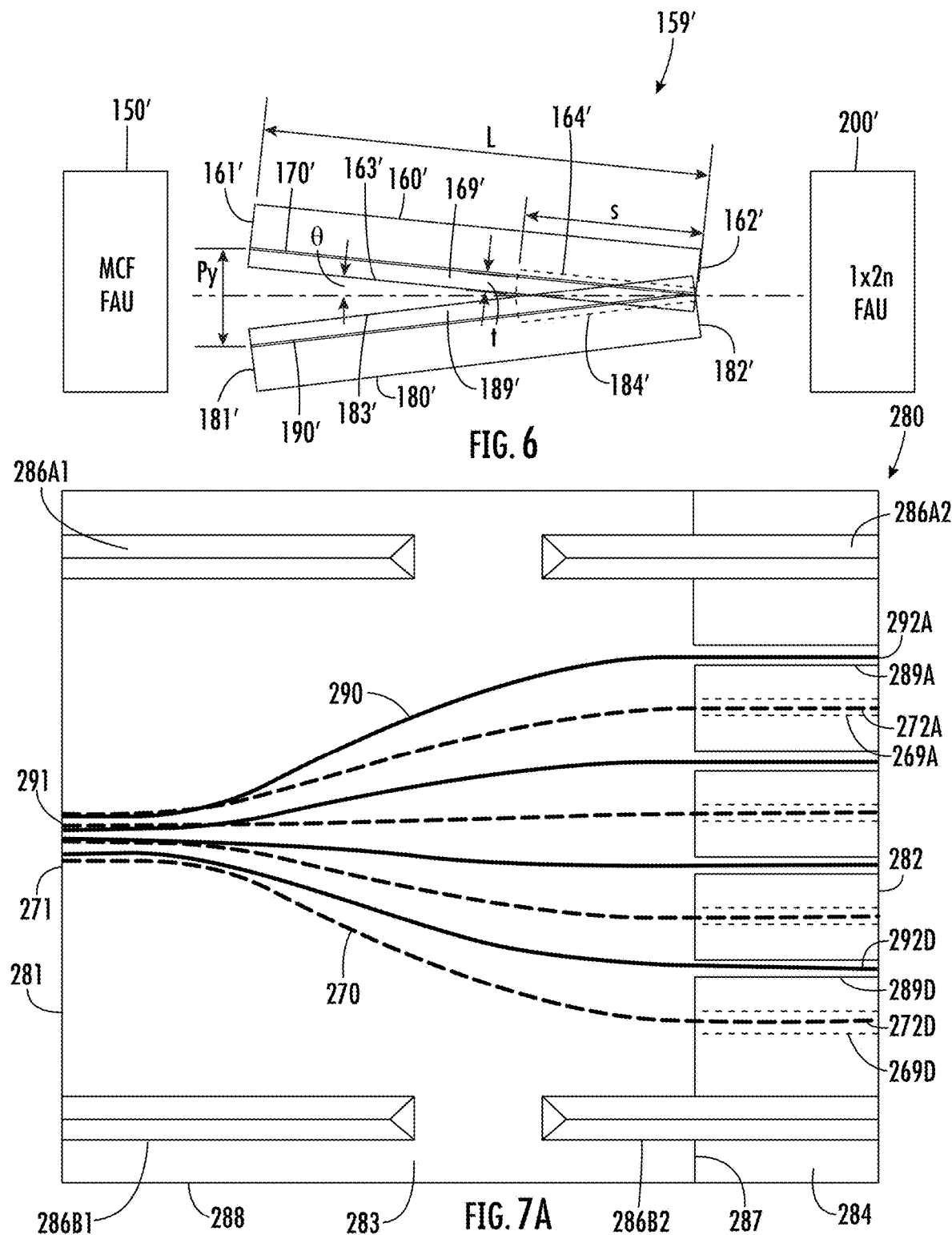

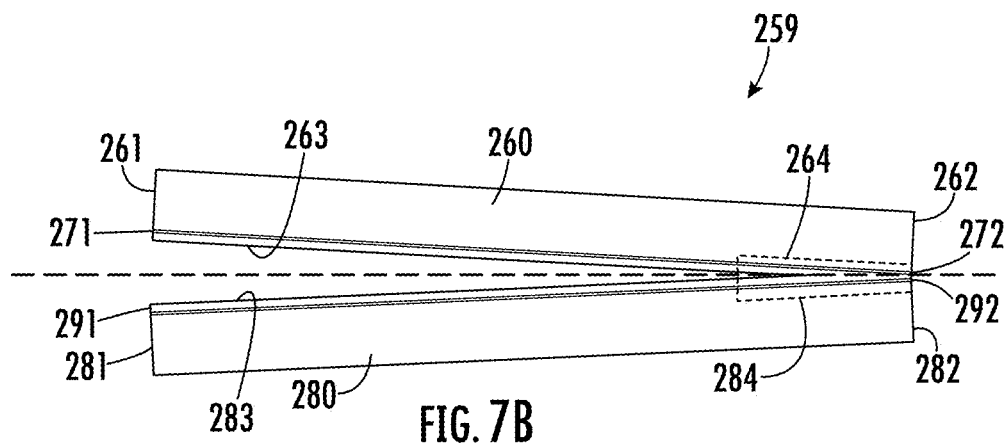
FIG. 7B
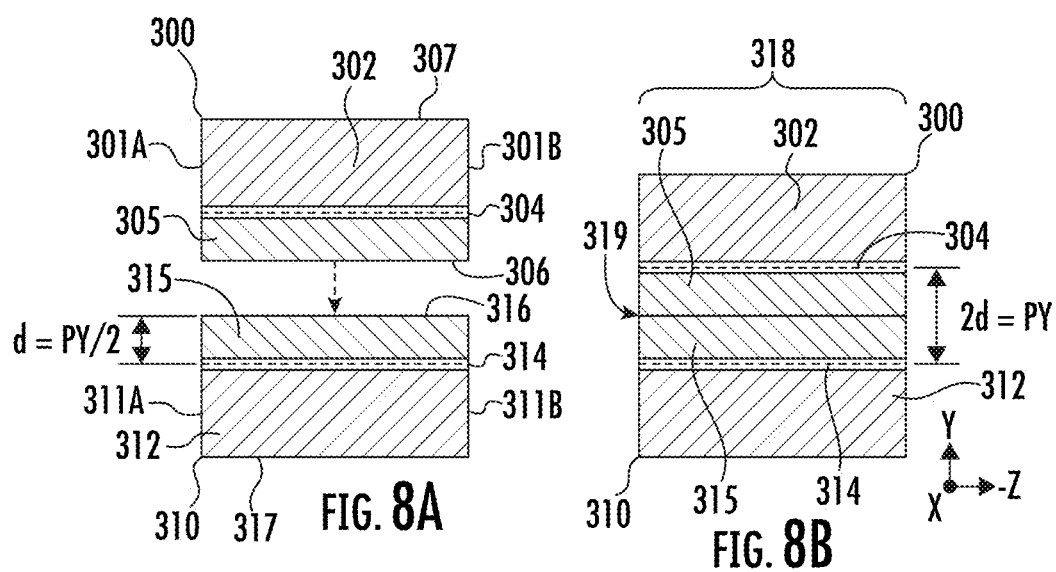
FIG. 8A
FIG. 8B

OPTICAL ASSEMBLY FOR INTERFACING WAVEGUIDE ARRAYS, AND ASSOCIATED METHODS

PRIORITY APPLICATION

This application claims the benefit of priority of U.S. Provisional Application No. 63/235,862, filed on Aug. 23, 2021, the content of which is relied upon and incorporated herein by reference in its entirety.

BACKGROUND

The disclosure relates generally to optical assemblies having embedded waveguides for interconnecting optical circuits (including optical circuits with multi-core optical fibers), and methods for their fabrication and use.

Optical fibers are useful in a wide variety of applications, including the telecommunications industry for voice, video, and data transmission. In a telecommunications system that uses optical fibers, there are typically many locations where fiber optic cables (which carry the optical fibers) connect to equipment or other fiber optic cables.

As the demand for high-density parallel data transmission has increased, technologies such as multi-fiber cable assemblies and multi-core optical fibers (also referred to as "multi-core fibers" or "MCFs") have been developed to enhance data handling capacity within a given cable envelope (volume) and to reduce costs. A MCF includes a single cladding that contains multiple cores each capable of transmitting a different optical signal. Although MCFs may be more cost effective and volumetrically efficient than utilizing individual optical fibers, challenges exist in providing reliable and low-cost interfaces between MCFs and individual waveguides (such as individual optical fibers) having a pitch and/or orientation that differs from cores arranged in MCFs, particularly when MCFs contain cores arranged in multi-dimensional arrays (e.g., arrays having two or more rows).

SUMMARY

An optical assembly according to certain aspects is configured to provide optical connections between arrays of external optical waveguides (i.e., external to the optical assembly) having differing pitch and/or orientation, with one array being two-dimensional and the other being one-dimensional. To make these optical connections, the optical assembly includes a first planar lightwave circuit (PLC) member having a plurality of first waveguides arranged in a first plane, and a second PLC member having a plurality of second waveguides arranged in a second plane, wherein the first and second PLC members are arranged with inner faces facing one another and with the first and second planes (corresponding to the pluralities of first and second waveguides, respectively) being non-parallel. At the input end faces of the first and second PLC members, input ends of the respective waveguides are arranged in a two-dimensional array, and at the output end faces of the first and second PLC members, output ends of the respective waveguides are arranged in a one-dimensional array. In certain implementations, the optical assembly can be used to provide optical connections between a MCF having fiber cores arranged in a two-dimensional array and a plurality of individual (e.g., single-mode) optical fibers arranged in a one-dimensional array having a differing core pitch and core orientation relative to the first two-dimensional array. Such an optical assembly can serve as a fanout interface. Methods for fabricating an optical assembly include fabricating first and second PLC members having alignment grooves and having a plurality of first waveguides and a plurality of second waveguides, respectively, and stacking the PLC members, with input end tubular alignment members arranged between paired first and second alignment grooves proximate to the first input end face and the second input end face, and with output end tubular alignment members arranged between paired first and second peripheral alignment grooves proximate to the first output end face and the second output end face. Securing the first and second PLC members around the respective alignment members causes the first and second input end faces to be positioned such that input ends of the first and second waveguides are arranged in a two-dimensional array, and causes the first and second output end faces to be positioned such that output ends of the first and second waveguides are arranged in a one-dimensional array.

In one aspect, the disclosure relates to an optical assembly that comprises: a first planar lightwave circuit (PLC) member including a first body structure bounded by a first inner face, a first outer face that opposes the first inner face, a first input end face, and a first output end face that opposes the first input end face, with a plurality of first waveguides defined in or on the first body structure, wherein the plurality of first waveguides extends between the first input end face and the first output end face in a first plane that is parallel to at least a portion of the first inner face; and a second PLC member including a second body structure bounded by a second inner face, a second outer face that opposes the second inner face, a second input end face, and a second output end face that opposes the second input end face, with a plurality of second waveguides defined in or on the second body structure, wherein the plurality of second waveguides extends between the second input end face and the second output end face in a second plane that is parallel to at least a portion of the second inner face; wherein the first and second PLC members are arranged with the first inner face of the first PLC member facing the second inner face of the second PLC member, and with the second plane being non-parallel to the first plane; wherein the first input end face and the second end input end face are positioned such that input ends of the plurality of first waveguides in combination with input ends of the plurality of second waveguides are arranged a two-dimensional array; and wherein the first output end face and the second output end face are positioned such that output ends of the plurality of first waveguides in combination with output ends of the plurality of second waveguides are arranged in a one-dimensional array.

In certain embodiments, the output ends of the plurality of first waveguides and the output ends of the plurality of second waveguides are alternately arranged in a lateral direction.

In certain embodiments, at the first input end face, the first waveguides of the plurality of first waveguides are spaced at a first pitch; at the second input end face, the second waveguides of the plurality of second waveguides are spaced at the first pitch; at the first output end face, the first waveguides of the plurality of first waveguides are spaced at a second pitch that is greater than the first pitch; and at the second output end face, the second waveguides of the plurality of second waveguides are spaced at the second pitch.

In certain embodiments, the first input end face and the first output end face are generally orthogonal to the first inner face and the first outer face, and the second input end face and the second output end face are generally orthogonal to the second inner face and the second outer face.

In certain embodiments, the first PLC member comprises a first thickness region proximate to the first input end face, the first PLC member comprises a second thickness region proximate to the first output end face that is reduced in thickness relative to the first thickness region of the first PLC member, and first waveguides of the plurality of first waveguides are elevated relative to the second thickness region of the first PLC member; and the second PLC member comprises a first thickness region proximate to the second input end face, the second PLC member comprises a second thickness region proximate to the second output end face that is reduced in thickness relative to the first thickness region of the second PLC member, and second waveguides of the plurality of second waveguides are elevated relative to the second thickness region of the second PLC member.

In certain embodiments, the first PLC member comprises a plurality of first wall elements extending in a transverse direction from the second thickness region of the first PLC member and elevating the plurality of first waveguides relative to the second thickness region of the first PLC member; and the second PLC member comprises a plurality of second wall elements extending in a transverse direction from the second thickness region of the second PLC member and elevating the plurality of second waveguides relative to the second thickness region of the second PLC member.

In certain embodiments, first peripheral alignment grooves are defined in the first inner face of the first body structure; second peripheral alignment grooves are defined in the second inner face of the second body structure; input end tubular alignment members are arranged between pairs of the first and second peripheral alignment grooves proximate to the first input end face and the second input end face; and output end tubular alignment members are arranged between pairs of the first and second peripheral alignment grooves proximate to the first output end face and the second output end face.

In certain embodiments, a first reference V-groove defined in the first inner face of the first body structure, wherein the first reference V-groove is substantially parallel to, and is shallower than, the first peripheral alignment grooves; and a second reference V-groove defined in the second inner face of the second body structure, wherein the second reference V-groove is substantially parallel to, and is shallower than, the second peripheral alignment-grooves.

In certain embodiments, the plurality of first waveguides comprises a plurality of first ion exchange waveguides or first laser-written waveguides that is recessed relative to at least a portion of the first inner face and is positioned closer to the first inner face than to the first outer face; and the plurality of second waveguides comprises a plurality of second ion exchange waveguides or second laser-written waveguides that is recessed relative to at least a portion of the second inner face and is positioned closer to the second inner face than to the second outer face.

In certain embodiments, the optical assembly further comprises: at least one first fiducial mark on the first inner face; and at least one second fiducial mark on the second inner face; wherein the at least one second fiducial mark is registered with the at least one first fiducial mark.

In certain embodiments, the optical assembly further comprises adhesive material arranged between the first inner face and the second inner face.

In certain embodiments, the optical assembly further comprises at least one (or both) of the following features (i) or (ii): (i) the first body structure comprises a first substrate and a first overcladding layer, wherein at least portions of first waveguides of the plurality of first waveguides are arranged between the first substrate and the first overcladding layer; or (ii) the second body structure comprises a second substrate and a second overcladding layer, wherein at least portions of second waveguides of the plurality of second waveguides are arranged between the second substrate and the second overcladding layer.

In certain embodiments, the plurality of first waveguides comprises a plurality of deposited dielectric first waveguides positioned closer to the first inner face than the first outer face; and the plurality of second waveguides comprises a plurality of deposited dielectric second waveguides positioned closer to the second inner face than the second outer face.

In another aspect, the disclosure relates to a method for fabricating an optical assembly, the method comprising: providing a first planar lightwave circuit (PLC) member including a first body structure bounded by a first inner face, a first outer face that opposes the first inner face, a first input end face, and a first output end face that opposes the first input end face, with a plurality of first waveguides defined in or on the first body structure, wherein the plurality of first waveguides extends between the first input end face and the first output end face in a first plane that is parallel to at least a portion of the first inner face, and wherein first peripheral alignment grooves are defined in the first inner face; providing a second PLC member including a second body structure bounded by a second inner face, a second outer face that opposes the second inner face, a second input end face, and a second output end face that opposes the second input end face, with a plurality of second waveguides defined in or on the second body structure, wherein the plurality of second waveguides extends between the second input end face and the second output end face in a second plane that is parallel to at least a portion of the second inner face, and wherein second peripheral alignment grooves are defined in the second inner face; positioning the first and second PLC members with the first inner face of the first PLC member facing the second inner face of the second PLC member, with input end tubular alignment members arranged between pairs of the first and second alignment grooves proximate to the first input end face and the second input end face, and with output end tubular alignment members arranged between pairs of the first and second peripheral alignment grooves proximate to the first output end face and the second output end face; and securing the first and second PLC members around the input end tubular alignment members and the output end alignment members to cause: (i) the second plane to be non-parallel to the first plane, (ii) the first input end face and the second input end face to be positioned such that input ends of the plurality of first waveguides in combination with input ends of the plurality of second waveguides being arranged a two-dimensional array, and (iii) the first output end face and the second output end face to be positioned such that output ends of the plurality of first waveguides in combination with output ends of the plurality of second waveguides being arranged a one-dimensional array.

In certain embodiments, the output ends of the plurality of first waveguides and the output ends of the plurality of second waveguides are alternately arranged in a lateral direction In certain embodiments, at the first input end face, the first waveguides of the plurality of first waveguides are spaced at a first pitch; at the second input end face, the second waveguides of the plurality of second waveguides are spaced at the first pitch; at the first output end face, the first waveguides of the plurality of first waveguides are spaced at a second pitch that is greater than the first pitch; and at the second output end face, the second waveguides of the plurality of second waveguides are spaced at the second pitch.

In certain embodiments, the first PLC member comprises a first thickness region proximate to the first end face, the second PLC member comprises a first thickness region proximate to the send end face, and the method further comprises: thinning a portion of the first PLC member to cause the first PLC member to include a second thickness region proximate to the first output end face that is reduced in thickness relative to the first thickness region of the first PLC member, and to cause first waveguides of the plurality of first waveguides to be elevated relative to the second thickness region of the first PLC member; and thinning a portion of the second PLC member to cause the second PLC member to include a second thickness region proximate to the second output end face that is reduced in thickness relative to the first thickness region of the second PLC member, and to cause second waveguides of the plurality of second waveguides to be elevated relative to the second thickness region of the second PLC member.

In certain embodiments, thinning of the portion of the first PLC member comprises etching the first PLC member to yield the second thickness region of the first PLC member, with a plurality of first wall elements extending in a transverse direction from the second thickness region of the first PLC member and elevating the plurality of first waveguides relative to the second thickness region of the first PLC member; and thinning of the portion of the second PLC member comprises etching the second PLC member to yield the second thickness region of the second PLC member, with a plurality of second wall elements extending in a transverse direction from the second thickness region of the second PLC member and elevating the plurality of second waveguides relative to the second thickness region of the second PLC member.

In certain embodiments, the method further comprises: defining a first reference V-groove in the first inner face of the first body structure, wherein the first reference V-groove is substantially parallel to, and is shallower than, the first peripheral alignment grooves; and defining a second reference V-groove in the second inner face of the second body structure, wherein the second reference V-groove is substantially parallel to, and is shallower than, the second peripheral alignment-grooves.

In certain embodiments, the providing of the first PLC member comprises defining the plurality of first waveguides by ion exchange or by laser processing, to cause the plurality of first waveguides to be recessed relative to the first inner face and to be positioned closer to the first inner face than to the first outer face; and the providing of the second PLC member comprises defining the plurality of second waveguides by ion exchange or by laser processing, to cause the plurality of second waveguides to be recessed relative to the second inner face and to be positioned closer to the second inner face than to the second outer face.

In certain embodiments, the securing of the first and second PLC members around the input end tubular alignment members and the output end alignment members comprising providing an adhesive between at least portions of the first and second PLC members.

In certain embodiments, the first input end face and the first output end face are generally orthogonal to the first inner face and the first outer face, and the second input end face and the second output end face are generally orthogonal to the second inner face and the second outer face.

In certain embodiments, the first input end face and the second input end face in combination define an input optical surface, the first output end face and the second output end face in combination define an output optical surface, and the method further comprises: polishing the input optical surface; and polishing the output optical surface.

In another aspect, features of any aspects or embodiments disclosed herein may be combined for additional advantage.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 6 is a schematic cross-sectional view of an optical interconnect system including an optical assembly having two stacked PLC members with waveguides along non-parallel inner faces, with the optical assembly arranged between (i) a first FAU having a MCF with cores arranged in a two-dimensional array, and (ii) a second FAU supporting a plurality of individual (e.g., single-mode) optical fibers arranged in a one-dimensional array.

FIG. 7A is a top plan view a first PLC member of an optical assembly according to one embodiment, with superimposed dashed lines showing positions of waveguides and waveguide supports of a second PLC member configured to cooperate with the first PLC member.

FIG. 7B is a side elevational view of an optical assembly including the first PLC member of FIG. 7A with a second PLC member arranged thereover.

FIG. 8A is an exploded side cross-sectional view of a portion of an optical assembly including two glass overclad PLC members with embedded waveguides and in a separated state, with glass overclad layers of the PLC members having a controlled thickness.

FIG. 8B is a side cross-sectional view showing the optical assembly portion of FIG. 8A with inner faces of the two overclad PLC members abutting one another.

DETAILED DESCRIPTION

Figure 1A:
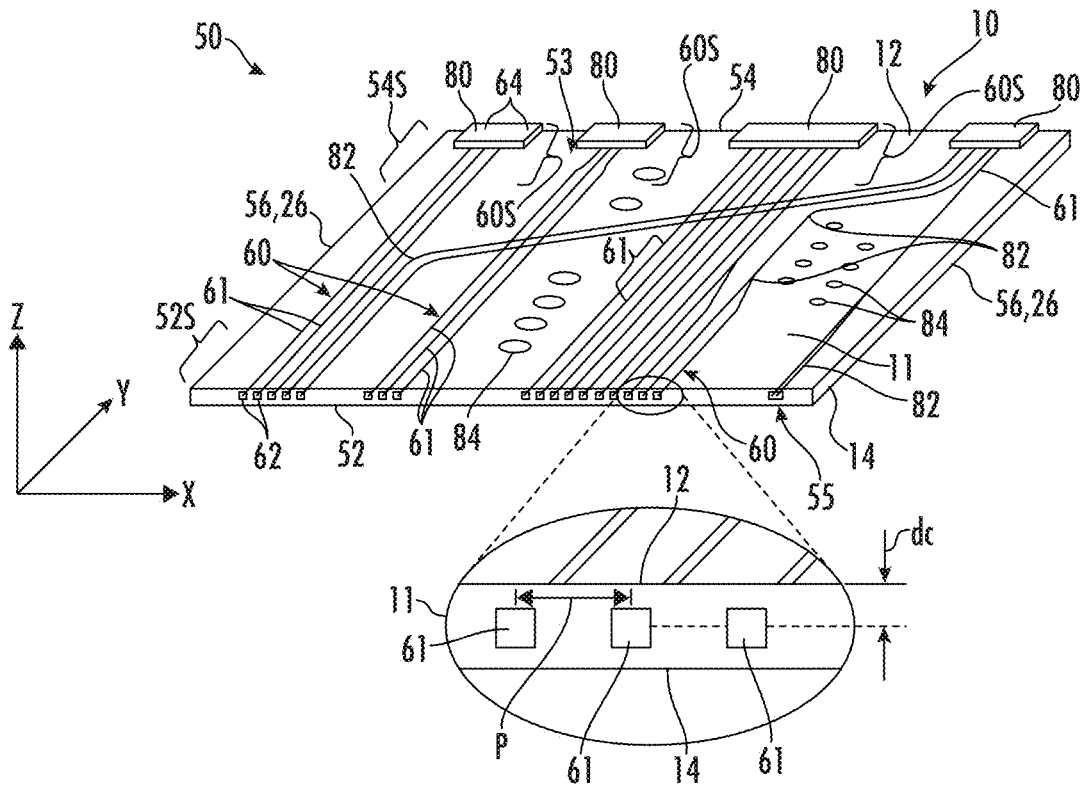
FIG. 1A is a perspective view of a waveguide assembly formed from a glass substrate with multiple glass optical waveguides defined along an upper surface thereof.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

Relative terms such as "below" or "above" or "upper" or "lower" or "horizontal" or "vertical" or "elevated" may be used herein to describe a relationship of one element, layer, or region to another element, layer, or region as illustrated in the drawing figures. It will be understood that these terms and those discussed above are intended to encompass different orientations of the device in addition to the orientation depicted in the drawing figures.

The terms "input end" and "output end" as used herein refer to opposing ends of a PLC member and/or optical assembly that may interface with external arrays of optical waveguides that may be embodied in cores of single-core or multi-core optical fibers, wherein such terms may be used interchangeably without one type being limited in function to either transmit or receive optical signals. That is, an input end of a PLC member may be used to transmit and/or receive optical signals, while an opposing output end of the PLC member may be used to transmit and/or receive optical signals.

The term "fiber array unit" (FAU) refers to a plurality of optical fiber cores, which may be from respective optical fibers or one or more multicore optical fibers, being arranged in an array, with the associated optical fiber(s) supported on a substrate The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

As introduced previously, an optical assembly according to certain aspects includes stacked first and second planar lightwave circuits (PLC) members that include, respectively, a plurality of first waveguides arranged in a first plane and a plurality of second waveguides arranged in a second plane, wherein the first and second PLC members are positioned with inner faces facing one another and with the first and second planes (corresponding to the pluralities of first and second waveguides, respectively), being non-parallel. At the input end faces of the first and second PLC members, input ends of the respective waveguides are arranged in a two-dimensional array, and at the output end faces of the first and second PLC members, output ends of the respective waveguides are arranged in a one-dimensional array. At the output end face, respective output ends of the plurality of first waveguides are alternately arranged in a lateral direction relative to respective output ends of the plurality of second waveguides. The input end face may be configured to interface with a MCF having cores arranged in a two-dimensional array. The provision of two stacked PLC members having waveguides therein arranged in non-parallel planes permits optical connections to external optical waveguides (e.g., single mode optical fibers, having differing pitch relative to cores of the MCF) arranged in a one-dimensional array, in a repeatable manner that facilitates groupwise alignment (and therefore good optical coupling) with the external optical waveguides.

Before describing optical assemblies and their fabrication, the formation of glass optical waveguides in or on glass substrates will be introduced.

Figure 1B:
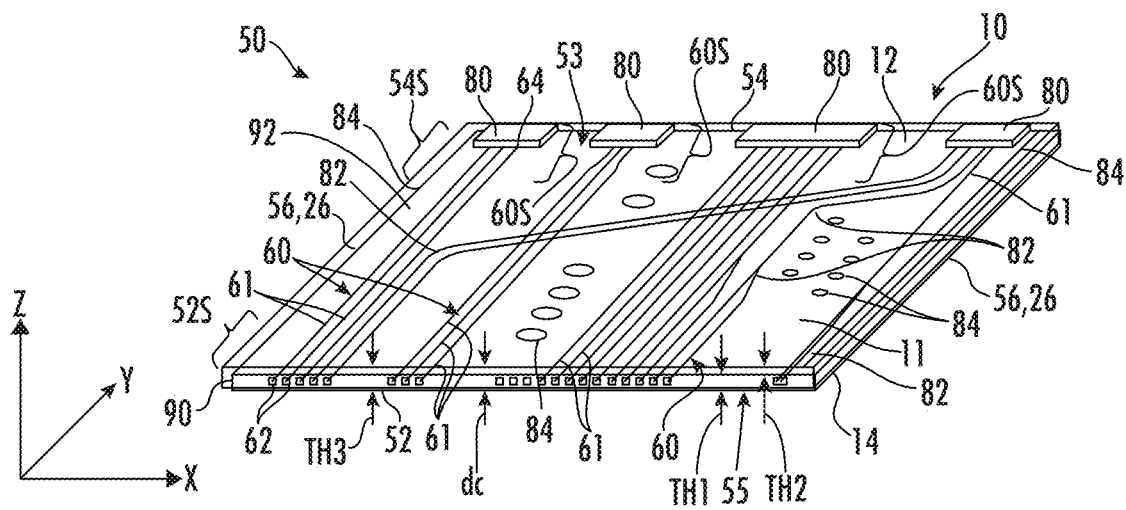
FIG. 1B is a perspective view of the waveguide assembly of FIG. 1A following addition of a protective coating over the upper surface of the glass substrate.

FIG. 1A is a perspective view of a glass waveguide assembly 50 formed from a glass substrate 10 with multiple glass optical waveguides ("waveguides") 61 defined in or on the glass substrate 10 (e.g., proximate to a top surface 12 thereof). FIG. 1B is a perspective view of the waveguide assembly 50 of FIG. 1A following addition of a protective coating 90 over the top surface 12 of the glass substrate 10. The glass waveguide assembly 50 has a front end 52, a back end 54, and sides 56 that respectively correspond to boundaries of the glass substrate 10. The glass waveguide assembly 50 also includes a top side 53 and a bottom side 55. The glass waveguide assembly 50 also includes a front-end assembly section 52S having the front end 52, and a back-end assembly section 54S having the back end 54.

With reference to FIGS. 1A and 1B, waveguides 61 define a waveguide array 60. Reference may be made herein to multiple waveguides 61 as well as to one or more waveguide arrays 60 by way of illustration.

The waveguides 61 are formed within a body 11 of the glass substrate 10 and extend generally in the y-direction from (at or near) the front end 52 to (at or near) the back end 54 of the glass substrate 10. Each waveguide 61 includes a front waveguide end 62 at or adjacent to the front end 52 of glass substrate 10 and a back waveguide end 64 at or near the back end 54 of the glass substrate 10. The waveguide array 60 includes a back-end section 60S that includes back waveguide ends 64. The waveguides 61 can also extend from the front end 52 of the glass substrate 10 or from the back end 54 of the glass substrate 10 to one of sides 56 of the glass substrate 10, e.g., by a combination of straight and/or curved waveguide sections 82.

The waveguides 61 are formed from glass, and in certain examples may be formed within a glass material of the body 11 by modifying the glass composition. In certain examples, this compositional modification may be accomplished by ion diffusion (e.g., electric field-assisted ion diffusion), by laser writing, or by a combination thereof. Thus, in certain examples, waveguides 61 may be formed within the body 11 of the glass substrate 10 without removing any glass from the body 11 or adding any glass to the body 11. In this context, it is noted that ion-diffusion does not result in the removal of glass or the addition of glass, but instead alters the composition of the glass by replacing existing mobile alkali ions in the glass with other alkali ions (e.g., replacing Na+ with K+) from an outside source, such as a molten bath. Likewise, laser writing does not remove any glass from the body 11 or add glass thereto, but instead locally alters the structure of the glass by locally compacting it, which in turn locally increases the refractive index.

In an example, the glass substrate 10 is made of ion-exchangeable glass, i.e., one that contains alkali ions such as $Na^+$. An example material for glass substrate 10 is a chemically strengthened glass (or a glass suitable for chemical strengthening). An example of such a glass is Corning® Gorilla® Glass, available from Corning, Inc., Corning, N.Y. In an example, glass substrate 10 is made of a $Ag^+$ ion-exchanged glass, e.g., where $Ag^+$ has been exchanged for $Na^+$ in the glass substrate. An ion exchange process for defining waveguides may include a single- or multi-step thermal or field-assisted ion-exchange with or without use of a mask layer for defining the waveguide layout. If desired, a waveguide layout may be defined by a mask layer formed on the top surface 12 of the glass substrate 10 prior to the ion-exchange. Waveguide layouts can be defined through the position of a focused laser by sequential laser writing. The resulting waveguides can be straight waveguides, curved waveguides, etc., and can include optical features or components such as tapers, crossings, splitters, combiners, and arcs, which may be combinable in fan-out or fan-in arrays in certain embodiments. In certain embodiments, a laser-based optical processing system (not shown) including a laser source, a focusing lens, and a movable support stage may be used to perform laser writing, to permit a focused laser beam to move relative to a glass substrate to define waveguides in the glass substrate (e.g., proximate to an upper surface thereof).

The depth dc to which waveguides 61 reside relative to the top surface 12 (or to a bottom surface 14) of the glass substrate 10 can vary, with reference to the magnified inset portion of FIG. 1A). Likewise, the pitch P (embodying center-to-center distance between adjacent waveguides) of a waveguide array 60 can vary with position, and in particular can vary in the y-direction as well as in the z-direction (e.g., in instances case where the body 11 supports different rows of waveguides 61 at different depths within body 11). Each waveguide 61 can include a tapered section and can also vary in size along its length. The path of each waveguide 61 can also vary, i.e., it need not run in a straight line, and as noted above need not run in a given x-y plane. The waveguides 61 can be single mode or multimode. In certain examples, the back waveguide ends 64 may define respective optical quality end faces, which in an example can be formed by polishing (e.g., laser polishing or mechanical polishing) or score and break (e.g., diamond wheel scoring or laser scoring and separation).

The glass waveguide assembly 50 also includes at least one waveguide termination member ("connector") 80 that terminates at least one waveguide 61 (e.g., at or adjacent to the back waveguide end 64) at the back-end assembly section 54S. In an example, a single connector 80 may embody a multi-waveguide connector (e.g., a MT type or MPO type connector) that terminates multiple waveguides 61. In an example, each connector 80 may terminate a corresponding array 60 of one or more waveguides 61. In another example, at least one connector 80 may include waveguides 61 from different waveguide arrays 60. In an example, connector 80 encloses the back-end array section 60S of waveguide array 60 at the back-end assembly section 54S.

The glass waveguide assembly 50 can also include one or more OE-PCB (Opto-Electronic Printed Circuit Board) features or components 84 to facilitate the use of the glass waveguide assembly 50 in forming an OE-PCB, as described below. Exemplary OE-PCB features or components 84 include conducting (e.g., metal-filled) vias, insulating (e.g., polymer-filled) vias, electrical (conducting) contacts, electrical (conducting) wiring, optical vias, slots, cut-outs, polymer-filled cut-outs, open holes, perforations, fiducials, alignment features, etc. In an example, OE-PCB features or components 84 may be formed by drilling, etching, milling, depositing, laser ablation, etc. In particular, cut-outs are relatively large sections removed from glass substrate 10 and that can be used for mounting glass waveguide assembly 50 to a PCB or OE-PCB. If desired, cut-outs can be filled with a non-glass material (e.g., a polymer), some or all of which can be removed later on in the OE-PCB fabrication process. The OE-PCB features or components 84 for alignment are formed where needed to allow for a simple passive alignment process for connectors 80 and for other photonic devices of an OE-PCB.

With reference to FIG. 1B, the glass waveguide assembly 50 includes a protective coating 90 that has an outer surface 92. The protective coating 90 covers at least a substantial portion of top surface 12 of the glass substrate 10. In an example, the protective coating 90 covers substantially the entire top surface 12. In an example, the protective coating 90 covers at least a portion of bottom surface 14. Further in the example, the protective coating 90 also covers at least a portion of sides 56. In an example, protective coating 90 is applied to the entire glass substrate 10 except optionally for select regions (e.g., one or more connector regions 15) so that the glass substrate is substantially encapsulated. Thus, the protective coating 90 may or may not include the one or more connector regions 15. In another example, the protective coating 90 runs the length in the y-direction of top surface 12 except for the one or more connector regions 15 and further in the example does not extend to sides 56. In an example, the protective coating 90 is selectively applied to some or all of the OE-PCB features or components 84 of glass waveguide assembly 50. In an example, the protective coating 90 is applied to the same portion of top surface 12 of glass substrate 10 below which, or at which, the waveguide array 60 is supported. In an example, the protective coating 90 may include a mechanically and thermally reliable material such as resin, polymer, acrylate, silicone, benzocyclobutene, ormocer or siloxane that can withstand thermal processes such as PCB lamination and/or flip chip solder reflow processing.

In an example, the protective coating 90 is a dielectric material compatible with conventional PCB processing, such as a polymer or a resin. If connectors 80 are formed prior to applying protective coating 90, the connector regions 15 can be left uncoated, e.g., by using a masking process or a selective deposition or coating process or lift-off process. In other examples, connectors 80 include a portion of protective coating 90 as formed on connector regions 15.

The protective coating 90 may function to protect the glass substrate 10 and any other OE-PCB features or components 84 of the glass waveguide assembly 50 during subsequent PCB processing, which can involve relatively high temperatures. A related function of the protective coating 90 is to facilitate the use of PCB processing techniques forming the glass waveguide assembly 50 as well as for forming an OE-PCB as described below. Thus, in an example, the protective coating 90 may be made of a thermally stable material, including such materials that are optically transparent. In an example, the protective coating 90 has a thickness TH2 in the range from 1 μm to 200 μm. Thus, in an example, glass waveguide assembly 50 has a thickness TH3=TH1+2(TH2) when top and bottom surfaces 12 and 14 of glass substrate 10 are coated, or has a thickness TH3=TH1+TH2 when only the top surface of the glass substrate is coated. In certain instances, less than all OE-PCB features or components 84 of the glass waveguide assembly 50 are encapsulated within the protective coating 90. For example, some of the OE-PCB features or components 84 (e.g., conductive vias 110) can extend through protective coating 90. Likewise, connectors 80 as well as some of the optical features or components (e.g., straight and/or curved waveguide sections 82) and the OE-PCB features or components 84 can also extend from or otherwise not be coated with protective coating 90. In an example, OE-PCB features or components 84 in the form of electrical wiring can be formed on an outer surface 92 of the protective coating 90.

Figure 2A:
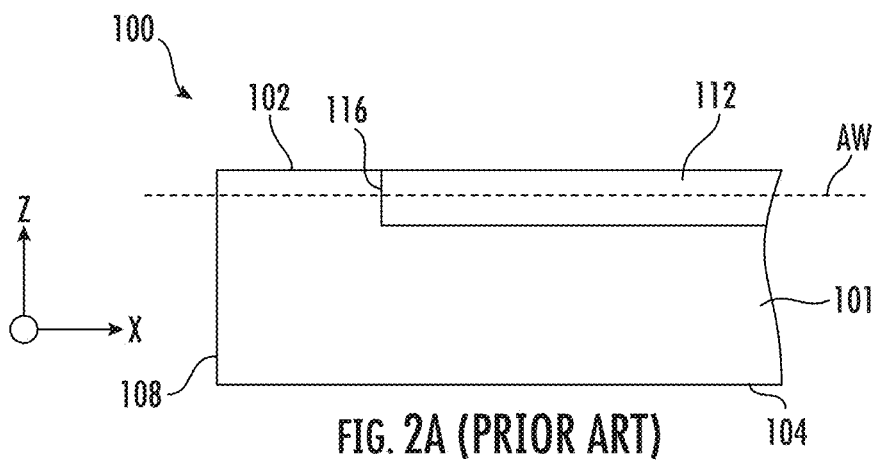
FIG. 2A is a magnified side (x-z) cross-sectional view of a peripheral portion of a waveguide assembly showing a glass optical waveguide defined along an upper surface of a glass substrate, with the glass optical waveguide terminating prior to reaching an edge of the substrate.

FIG. 2A is a magnified side (x-z) cross-sectional view of a peripheral portion of a waveguide assembly 100 showing a waveguide 112 defined along an upper surface 102 of a glass substrate 101, with the waveguide 112 terminating prior to reaching an edge 108 of the glass substrate 101. In an example, the substrate 101 may comprises a glass-based material, such as a glass, a glass-ceramic or a crystal. Example glasses can include soda-lime, borosilicate, germanosilicate, aluminosilicate ion-exchanged glasses, non-ion-exchanged glasses, chalcogenide glasses, or fused silica. Example crystals can include sapphire, diamond, lithium niobate, lithium tantalite, lithium triborate, barium borate, silicon, InP, and GaAs. In certain examples, the substrate 101 can be chemically strengthened, wherein the chemical strengthening can be localized or can extend over the entire volume of the substrate 101. As shown, the waveguide 112 has a waveguide axis AW and an end surface (facet) 116. The example waveguide 112 has an end surface 116 that resides with the glass substrate 101.

Figure 2B:
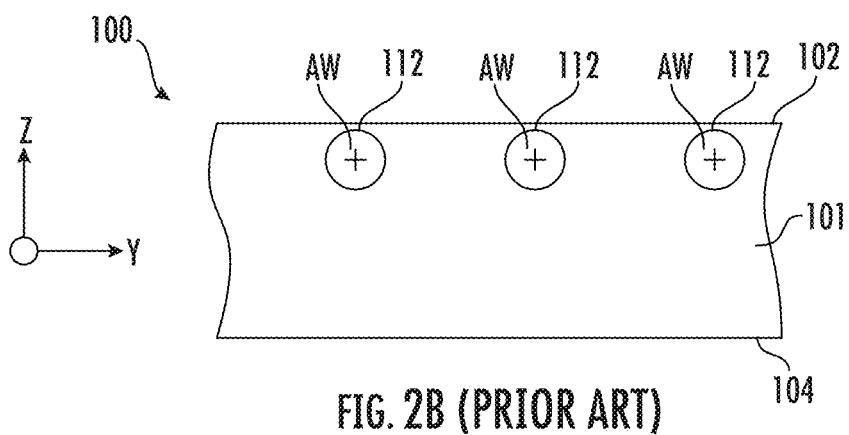
FIG. 2B is a magnified side (y-z) cross-sectional view of the waveguide assembly of FIG. 2A showing glass optical waveguides defined along the upper surface of the glass substrate.

FIG. 2B is a magnified side (y-z) cross-sectional view of the waveguide assembly 100 of FIG. 2A showing three waveguides 112 defined along the upper surface 102 of the glass substrate. In an example, the waveguides 112 can be formed by an ion-exchange process. In another example, the waveguides 112 can be formed using a laser-writing process. In other examples, the waveguides 112 can be formed using an ion-beam milling process, a photolithography process, an electron-beam lithography process, a thin-film deposition process, a lamination process, etching, deposition, and any other waveguide-forming process known in the art.

Generally, the waveguides 112 define localized regions of increased refractive index relative to remainder of the glass substrate 101. Two example techniques for forming the waveguides 112 include ion exchange and laser writing. For waveguides 112 formed within the glass substrate 101, the surrounding portion of the glass substrate 101 and the region immediately adjacent to the upper surface 102 (when the waveguide is at or near the upper surface) define a cladding for the waveguide 112. For ease of illustration and discussion, waveguides 112 considered herein are shown as formed within the substrate 101 and having a definite boundary with the substrate 101.

Figure 2C:
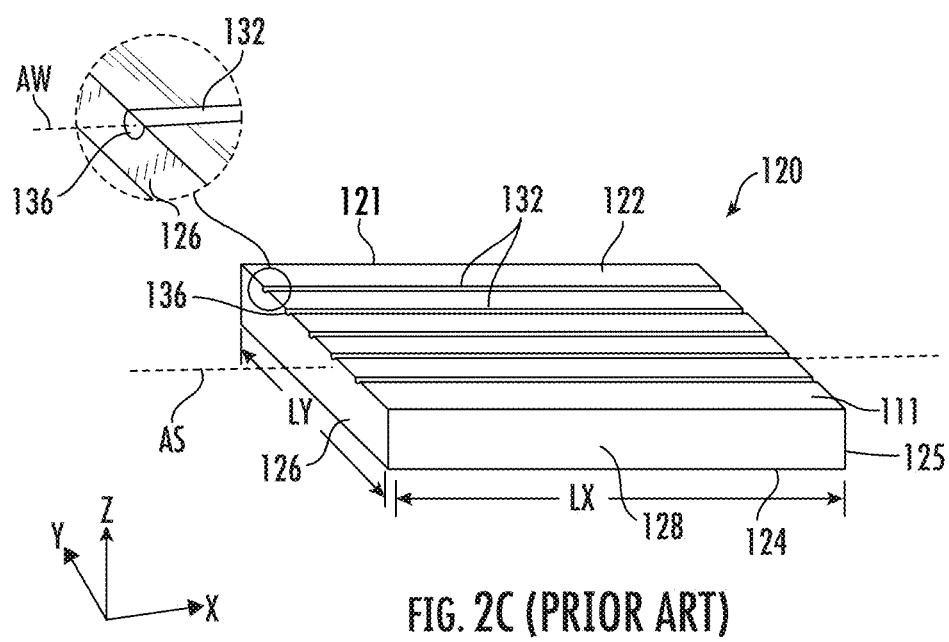
FIG. 2C is a perspective view of a waveguide assembly similar to the waveguide assembly shown in FIGS. 2A-2B, but with glass optical waveguides extending to edges of the glass substrate.

FIG. 2C is a perspective view of a waveguide assembly 120 similar to the waveguide assembly 100 shown in FIGS. 2A-2B, but with glass optical waveguides ("waveguides") 132 extending to front and rear faces 126, 126 of a glass substrate 121. The glass substrate 121 further includes an upper surface 122, a lower surface 124, and side edges 128. The glass substrate 121 has central substrate axis AS that runs through a center of the glass substrate 121 in the x-direction, as well as a length LX in the x-direction and a length LY in the y-direction. As illustrated, the waveguides 132 run in the x-direction and comprise sections of the glass substrate 121 that have been processed to change one or more optical properties thereof. As shown, each waveguide 132 includes an end surface 136 (facet) that resides at the front face 126 of the glass substrate 121, and may include another end surface (not shown) residing at the rear face 125.

Although the preceding figures illustrate formation of waveguides within body structures in the form glass substrates, in certain embodiments waveguides may be deposited on or over substrates, overcladding layers, or undercladding layers, each independently selected from glass, silicon, fused silica, sapphire, silicon carbide, lithium niobate, or other crystalline or non-crystalline materials as disclosed herein, in the course of fabricating planar lightwave circuit (PLC) members. Examples of processes that may be used to deposit waveguides on or over substrates, overcladding layers, or undercladding layers include chemical vapor deposition (CVD) and flame hydrolysis deposition (FHD). Deposited waveguides may comprise dielectric material in certain embodiments. In certain embodiments, deposited waveguides may be covered with one or more overcladding layers (of glass or other material) to cause the resulting waveguides to be arranged below a surface of cladding material. Additionally, PLC members as disclosed herein may include one or more undercladding layers optionally in combination with overcladding layers, in addition to substrates. A PLC member according to various embodiments may be broadly construed as having a body structure, with waveguides arranged in or on the body structure, wherein a body structure may comprise a substrate, optionally in combination with one or more overcladding and/or undercladding layers.

Individual waveguide assemblies such as described in connection with FIGS. 1A to 2C may be mated with one-dimensional arrays of waveguides. However, it is more challenging to provide optical connections with multi-dimensional arrays of optical waveguides, such as may be embodied in a multi-core fiber (MCF) or a fiber array unit (FAU) with waveguides (e.g., fiber cores) arranged in a two-dimensional array.

Figure 3:
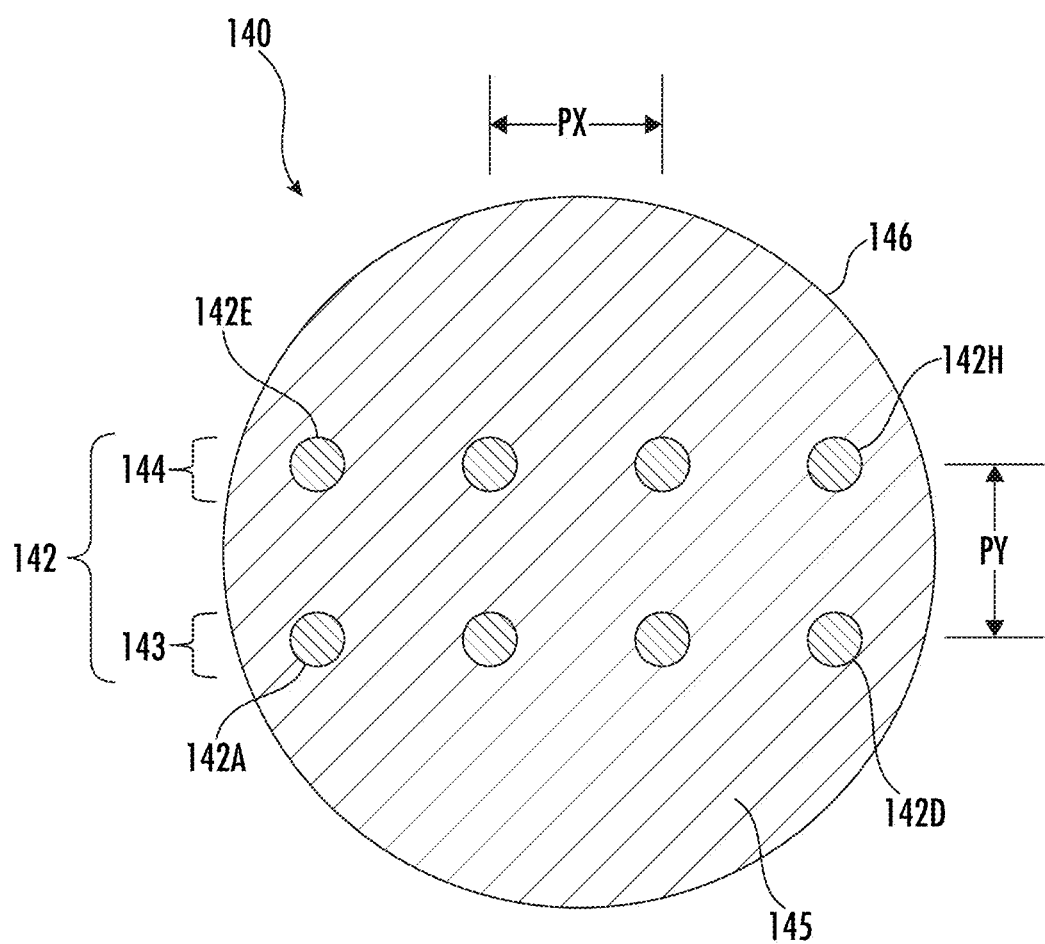
FIG. 3 is a cross-sectional view of a multi-core fiber (MCF) including eight cores arranged in two rows of four cores within a single cladding.

FIG. 3 illustrates one example of a MCF 140 having eight cores 142A-142H (collectively, cores 142) disposed within a single cladding 145, with four cores 142A-142D arranged in a lower row 143 and four cores 142E-142H arranged in an upper row 144. A spacing between the lower row 143 and the upper row 144 of cores 142 embodies a Y-axis pitch (or PY, measured from core center to core center), and a lateral spacing between cores 142 in each row 143, 144 embodies an X-axis pitch (or PX). Although eight cores 142A-142H are shown, it is to be appreciated that a MCF useable with optical assemblies described herein may include any suitable number of four, six, eight, ten, twelve, fourteen, sixteen, eighteen, twenty, twenty-two, twenty-four, thirty, thirty-six, or more cores arranged in multiple rows according to certain embodiments.

Having described methods for providing substrates with waveguides, and multi-core fibers, optical assemblies for providing optical connections between a two-dimensional array of external optical waveguides at an input end, and a one-dimensional array of external optical waveguides at an output end, including in certain embodiments group member waveguides that are interspersed at the output end, will now be described.

Figure 4A:
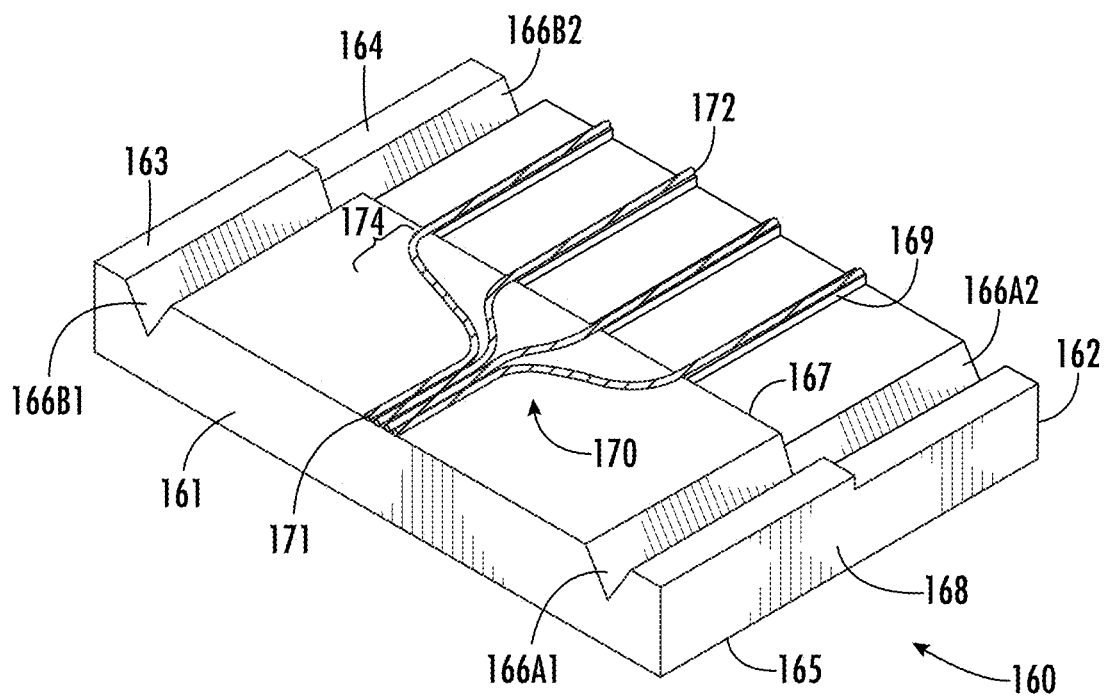
FIG. 4A is a perspective view of a first planar lightwave circuit (PLC) member including a plurality of first waveguides and peripheral alignment grooves along an inner face of the first PLC member, with the first waveguides arranged in a first thickness region of the first PLC member proximate to an input end and that is elevated by wall elements relative to a second thickness region of the first PLC member proximate to an output end, and with the first PLC member being suitable for cooperating with a second PLC member (according to FIG. 4B) for fabricating an optical assembly according to one embodiment of the present disclosure, wherein the inner face of the first PLC member is pointing upward.

FIG. 4A is a perspective view of a first planar lightwave circuit (PLC) member 160 including a plurality of first waveguides 170 and peripheral alignment grooves 166A1, 166A2, 166B1, 166B2 along first and second inner face regions 163, 164 that each oppose an outer face 165 of the PLC member 160. The outer face 165 extends from an input (or front) end 161 to an output (or rear) end 162 of the PLC member 160, wherein the input and output ends 161, 162 (which serve as optical surfaces) extend in planes that are transverse to the outer face 165 and the first and second inner face regions 163, 164. The input and output ends 161, 162 may be polished by any suitable means (mechanical polishing, chemical-mechanical polishing, or the like) to enhance optical properties thereof, consistent with these ends 161, 162 serving as optical surfaces. The first inner face region 163 is closer to the input end 161, and the second inner face region 164 is closer to the output end 162, while the first and second inner face regions 163, 164 in combination extend from the input end 161 to the output end 162 and extend to sides 168 of the PLC member 160. The PLC member 160 has a first thickness (which may be termed a first thickness region) along the first inner face region 163, and has a reduced second thickness (which may be termed a second thickness region) along the second inner face region 164 A thickness transition 167, which may be a step transition or a more gradual transition, is provided between the first and second inner face regions 163, 164. The plurality of first waveguides 170 is arranged in a first plane that is proximate to a surface of the first inner face region 163, and that is elevated (using wall elements 169) relative to a surface of the second inner face region 164. In certain embodiments, the wall elements 169 may be formed by sawing, by photolithographic patterning and etching, and/or by machining with mechanical tools or water jets. The first waveguides 170 include first ends 171 having a first pitch at the input end 161, the first waveguides 170 include second ends 172 having a second, larger pitch at the output end 162, and the first waveguides 170 include a transition region 174 (located along the first inner face region 163) in which the first waveguides 170 transition from the first pitch to the second pitch. A first pair of peripheral alignment grooves 166A1, 166B1 are defined in the first inner face region 163, and a second pair of peripheral alignment grooves 166A2, 166B2 are defined in the second inner face region 164, wherein each peripheral alignment groove 166A1, 166B1, 166A2, 166B2 may embody a V-groove and may be configured to receive a corresponding tubular alignment member (e.g., as shown in FIGS. 4C-4F).

Figure 4B:
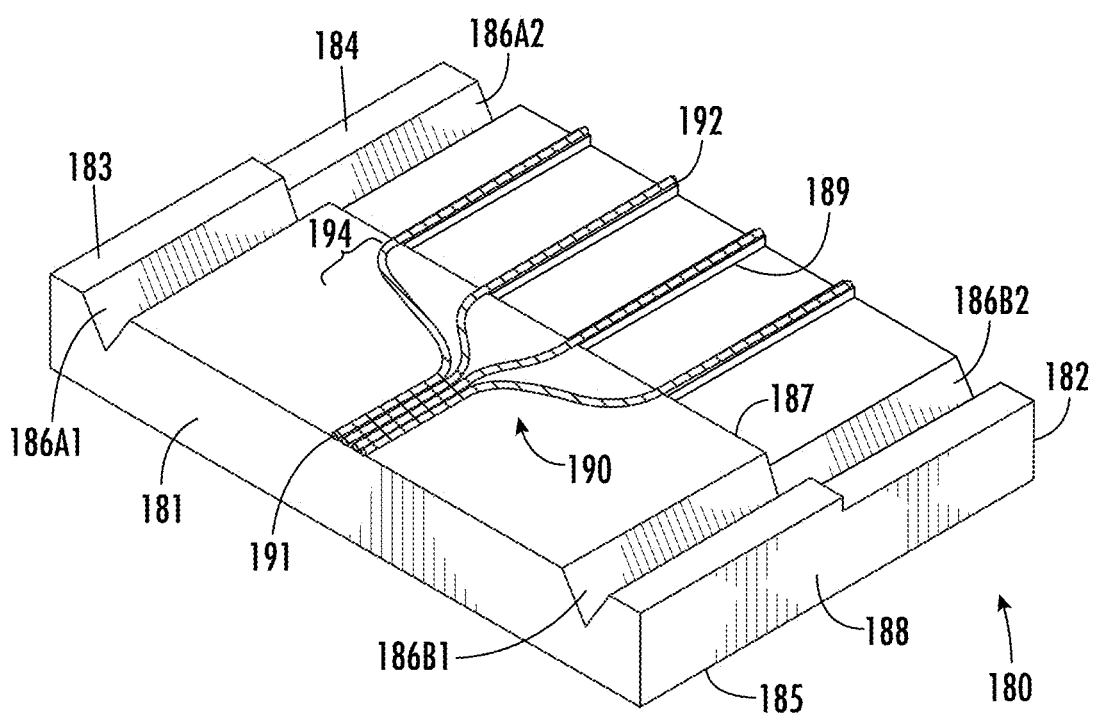
FIG. 4B is a perspective view of a second PLC member (similar to the first PLC member of FIG. 4A) including a plurality of second waveguides and peripheral alignment grooves along an inner face of the second PLC member, with the second waveguides arranged in a first thickness region of the second PLC member proximate to an input end and that is elevated by wall elements relative to a second thickness region of the second PLC member proximate to an output end, wherein the inner face of the second PLC member is pointing upward.

FIG. 4B is a perspective view of a second PLC member 180 that is similar to the first PLC member 160 of FIG. 4A. The second PLC member 180 includes a plurality of second waveguides 190 and peripheral alignment grooves 186A1, 186A2, 186B1, 186B2 along first and second inner face regions 183, 184 that each oppose an outer face 185 of the PLC member 180. The outer face 185 extends from an input (or front) end 181 to an output (or rear) end 182 of the second PLC member 180, wherein the input and ends 181, 182 (which serve as optical surfaces) extend in planes that are transverse to the outer face 185 and the first and second inner face regions 183, 184. The first inner face region 183 is closer to the input end 181, and the second inner face region 184 is closer to the output end 182, while the first and second inner face regions 183, 184 in combination extend from the input end 181 to the output end 182, and extend to sides 188 of the PLC member 180. The PLC member 180 has a first thickness (which may be termed a first thickness region) along the first inner face region 183, and has a reduced second thickness (which may be termed a second thickness region) along the second inner face region 184 A thickness transition 187, which may be a step transition or a more gradual transition, is provided between the first and second inner face regions 183, 184. The plurality of second waveguides 190 is arranged in a second plane that is proximate to a surface of the first inner face region 183, and that is elevated (using wall elements 189) relative to a surface of the second inner face region 184. The second waveguides 190 include first ends 191 having a first pitch at the input end 181, the second waveguides 190 include second ends 192 having a second, larger pitch at the output end 182, and the second waveguides 190 include a transition region 194 (located along the first inner face region 183) in which the first waveguides 190 transition from the first pitch to the second pitch. A first pair of peripheral alignment grooves 186A1, 186B1 are defined in the first inner face region 183, and a second pair of peripheral alignment grooves 186A2, 186B2 are defined in the second inner face region 184, wherein each peripheral alignment groove 186A1, 186B1, 186A2, 186B2 may embody a V-groove and may be configured to receive a corresponding tubular alignment member to promote alignment between the second waveguide member 180 of FIG. 4B and the first waveguide member 160 of FIG. 4A.

Figure 4C:
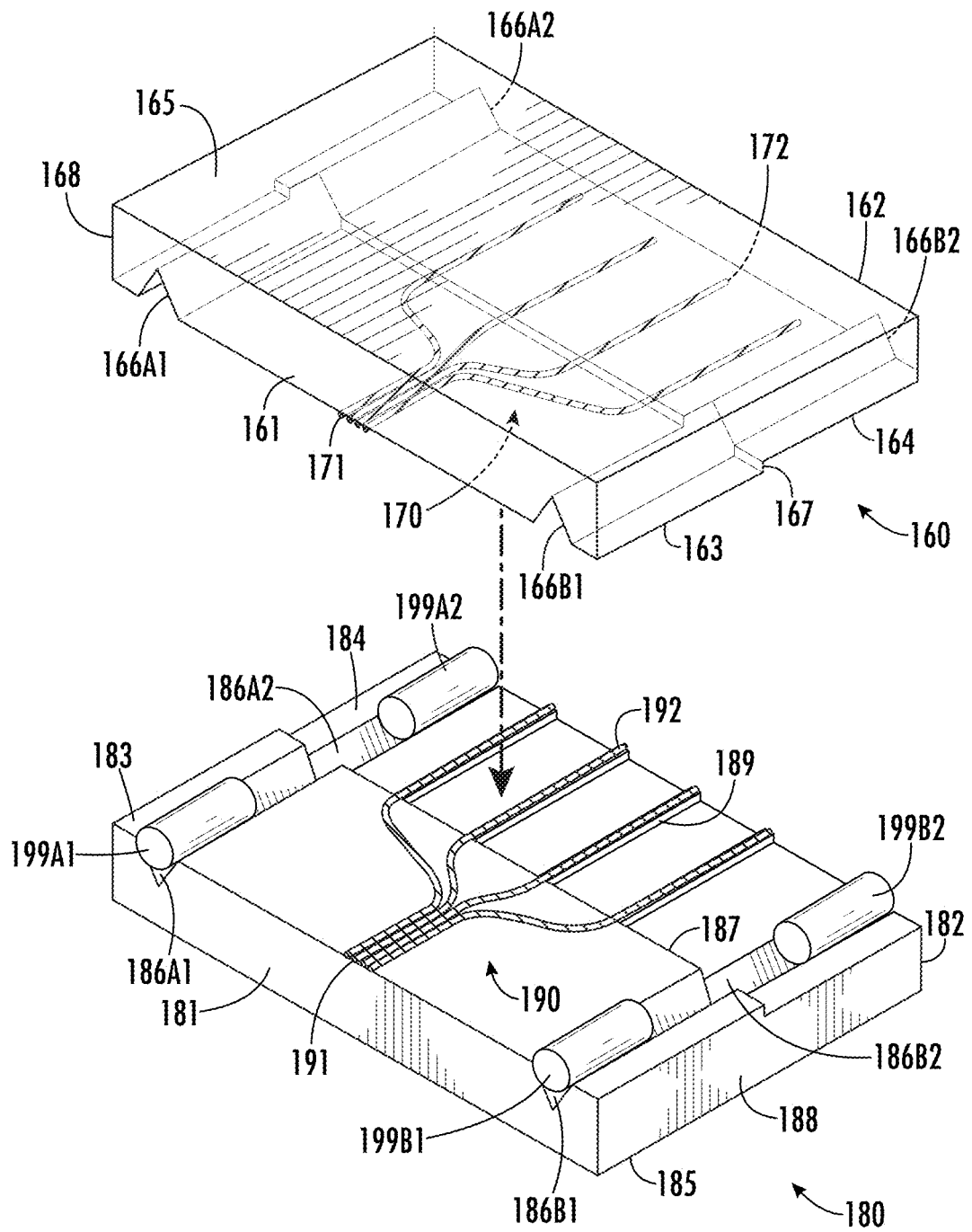
FIG. 4C is an exploded perspective view of an optical assembly including the first and second PLC members of FIGS. 4A-4B, with four tubular alignment members positioned in peripheral alignment grooves of the second PLC member.

FIG. 4C is an exploded perspective view of an optical assembly 159 including the first and second PLC members 160, 180 of FIGS. 4A-4B, respectively, with four tubular alignment members 199A1, 199B1, 199A2, 199B2 received in the peripheral alignment grooves 186A1, 186B1, 186A2, 186B2, respectively, of the second PLC member 180. In certain embodiments, the tubular alignment members 199A1, 199B1, 199A2, 199B2 may embody cylindrical glass members, such as glass optical fiber segments, and may be solid (e.g., solid cylindrical rods) or hollow in character. A first pair of tubular alignment members 199A1, 199B1 may each have a length shorter than the peripheral alignment grooves 186A1, 186B1 defined in the first inner face region 183, and may be positioned closer to the input end 181 than to the thickness transition 187. Similarly, a second pair of tubular alignment members 199A2, 199B2 may each have a length shorter than the peripheral alignment grooves 186A2, 186B2 defined in the second inner face region 183, and may be positioned closer to the output end 182 than to the thickness transition 187. In certain embodiments, the first pair of tubular alignment members 199A1, 199B1 may have the same lengths and/or diameters as the second tubular alignment members 199A2, 199B2. The remaining elements of the first and second PLC members 160, 180 are identical to those described in FIGS. 4A-4B.

Figure 4D:
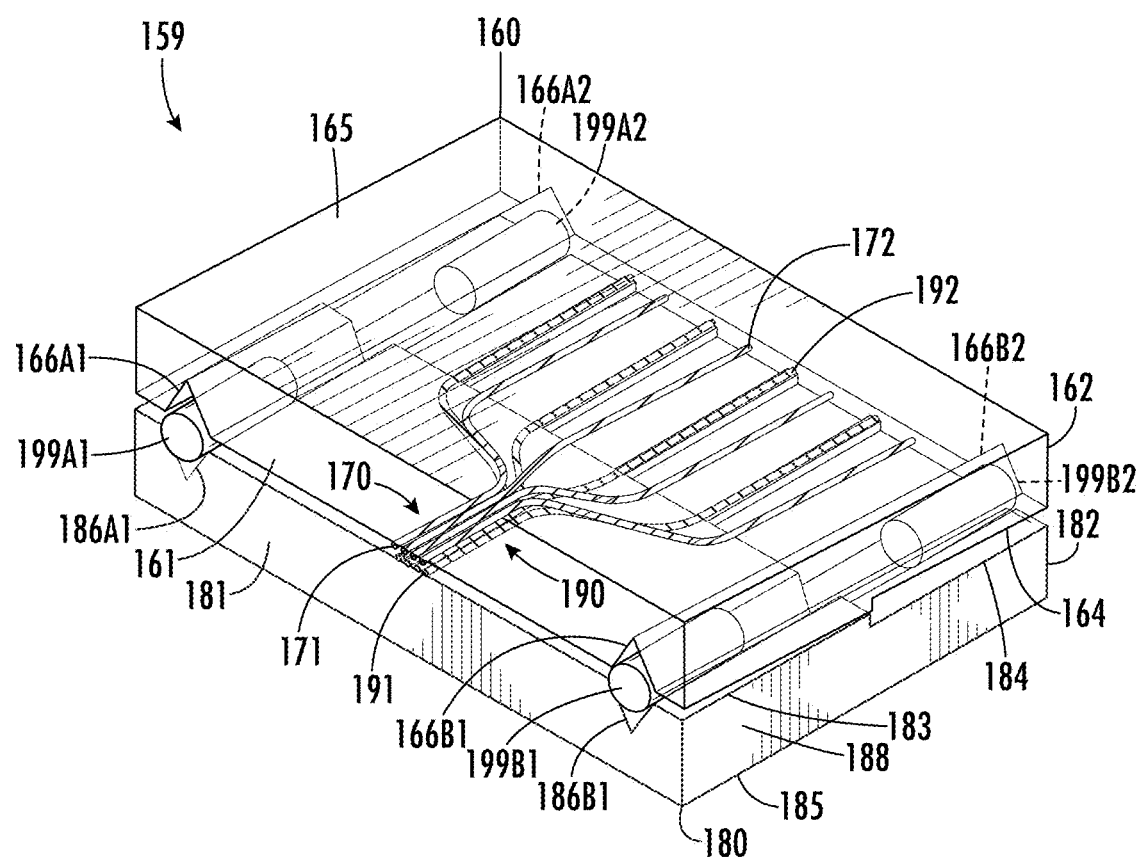
FIG. 4D is a perspective view of an optical assembly including the PLC members and tubular alignment members of FIG. 4C in an assembled state.

FIG. 4D is a perspective view of an optical assembly 159 including the PLC members 160, 180 and tubular alignment members 199A1, 199B1, 199A2, 199B2 of FIG. 4C in an assembled state. A first pair of tubular alignment members 199A1, 199B1 is arranged between (i) peripheral alignment grooves 166A1, 166B1 defined in the first inner face region 163 of the first PLC member 160, and (ii) peripheral alignment grooves 186A1, 186B1 defined in the first inner face region 183 of the second PLC member 180. A second pair of tubular alignment members 199A2, 199B2 is arranged between (i) peripheral alignment grooves 166A2, 166B2 defined in the second inner face region 164 of the first PLC member 160, and (ii) peripheral alignment grooves 186A2, 186B2 defined in the second inner face region 184 of the second PLC member 180. Presence of different thickness regions of the first and second PLC members 160, 180 (i.e., with greater thicknesses at portions corresponding to the first inner face regions 163, 183, and lesser thicknesses at portions corresponding to the second inner face regions 164, 184), and use of two pairs of tubular alignment members 199A1, 199B1, 199A2, 199B2, permits the plurality of first waveguides 170 to be arranged in a plane non-parallel to a plane that includes the plurality of second waveguides 190 when the first and second PLC members 160, 180 are assembled around the tubular alignment members 199A1, 199B1, 199A2, 199B2 (as shown in FIG. 4D). As shown, the first ends 171, 191 of the pluralities of first and second waveguides 170, 190 are arranged in a two-dimensional array at input ends 161, 181 of the first and second PLC members 160, 180, while the second ends 172, 192 of the of the pluralities of first and second waveguides 170, 190 are arranged in an interleaved manner (with alternating individual first and second waveguides 170, 190) to form a one-dimensional array at output ends 162, 182 of the first and second PLC members 160, 180. So positioned, the first ends 171, 191 of the pluralities of first and second waveguides 170, 190 may have spacing that corresponds to cores of a MCF (e.g., the MCF 140 shown in FIG. 3), while the second ends 172, 192 of the pluralities of first and second waveguides 170, 190 may have spacing that corresponds to cores of individual (e.g., single-mode) optical fibers (not shown). The remaining elements of FIG. 4D are the same as described in connection with FIGS. 4A-4B.

Figure 4E:
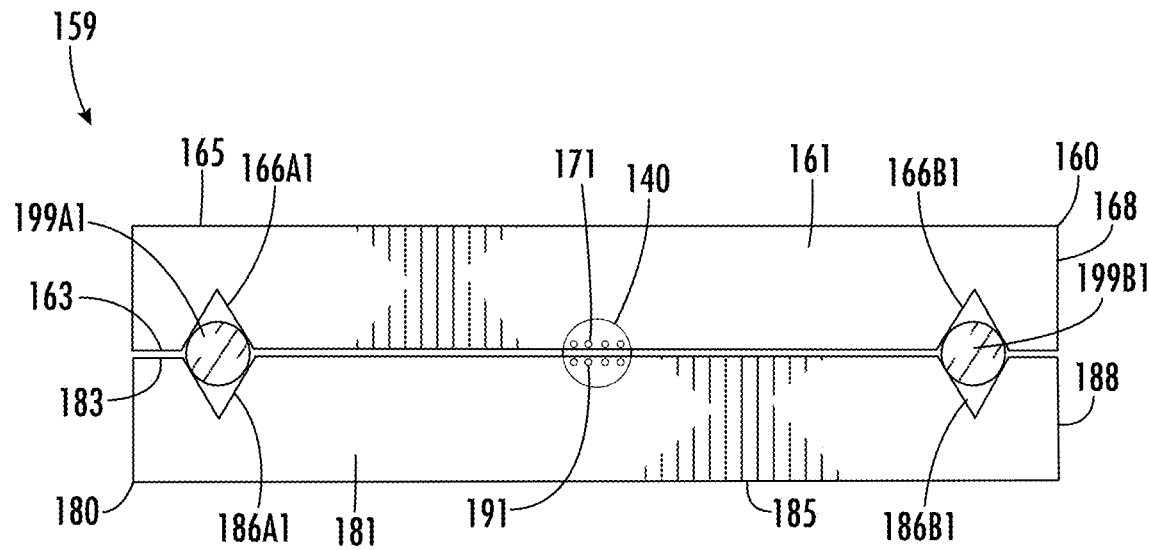
FIG. 4E is a front elevational view of the optical assembly of FIG. 4D, with a superimposed centrally located circle corresponding to the location of a MCF having cores in a two-dimensional array for interfacing with first and second waveguides at input ends of the first and second PLC members, respectively.
Figure 4F:
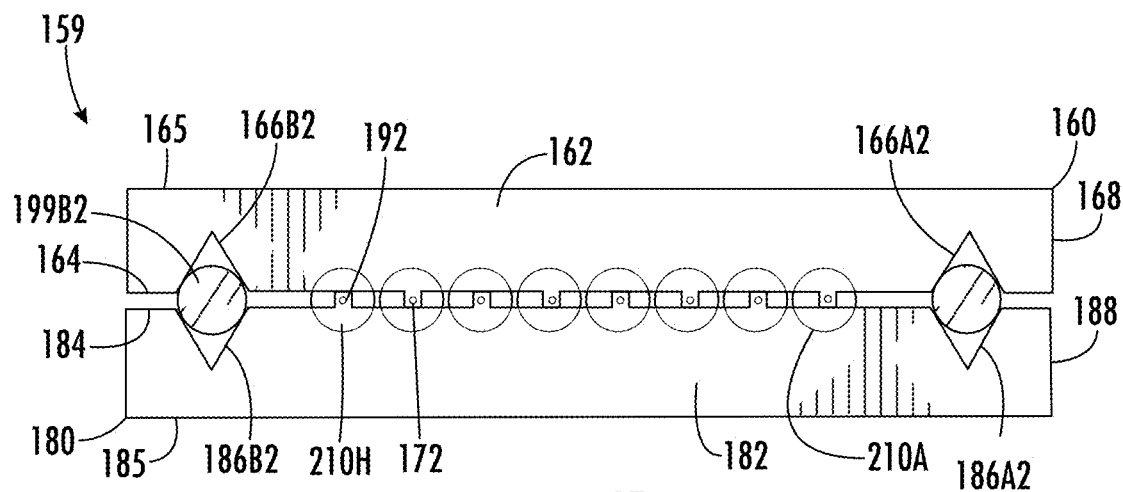
FIG. 4F is a rear elevational view of the optical assembly of FIG. 4D, with eight superimposed circles arranged in a one-dimensional array for interfacing with first and second waveguides at output ends of the first and second PLC members, respectively.

FIG. 4E is a front elevational view of the optical assembly 159 of FIG. 4D, with a superimposed centrally located circle corresponding to the location of a MCF 140 (external to the optical assembly 159) having cores in a two-dimensional array for interfacing with input ends 171, 191 of the first and second waveguides the first and second PLC members 160, 180, respectively. As shown, corresponding first inner face regions 163, 183 of the first and second PLC members 160, 180, respectively, are facing one another. A first tubular alignment member 199A1 is arranged between, and in contact with, two peripheral alignment grooves 166A1, 186A1, while a second tubular alignment member 199B1 is arranged between, and in contact with, two other peripheral alignment grooves 166B1, 186B1. FIG. 4F is a rear elevational view of the optical assembly 159 of FIGS. 4D-4E, with a superimposed circles corresponding to locations of individual (e.g., single-mode) optical fibers 210A-210H external to the optical assembly 159 and arranged in a one-dimensional array, for interfacing with output ends 172, 192 of the pluralities of first and second waveguides 170, 190. A comparison of FIGS. 4E and 4F shows that the thicknesses of the first and second PLC members 160, 180 at the output ends 162, 182 (corresponding to the second inner face regions 164, 184 and shown in FIG. 4F) are smaller than the thicknesses of the first and second PLC members 160, 180 at the input ends 161, 181 (corresponding to the first inner face regions 163, 183 shown in FIG. 4E). The remaining elements of FIGS. 4E and 4F are the same as described in connection with FIGS. 4A-4B.

Figure 5:
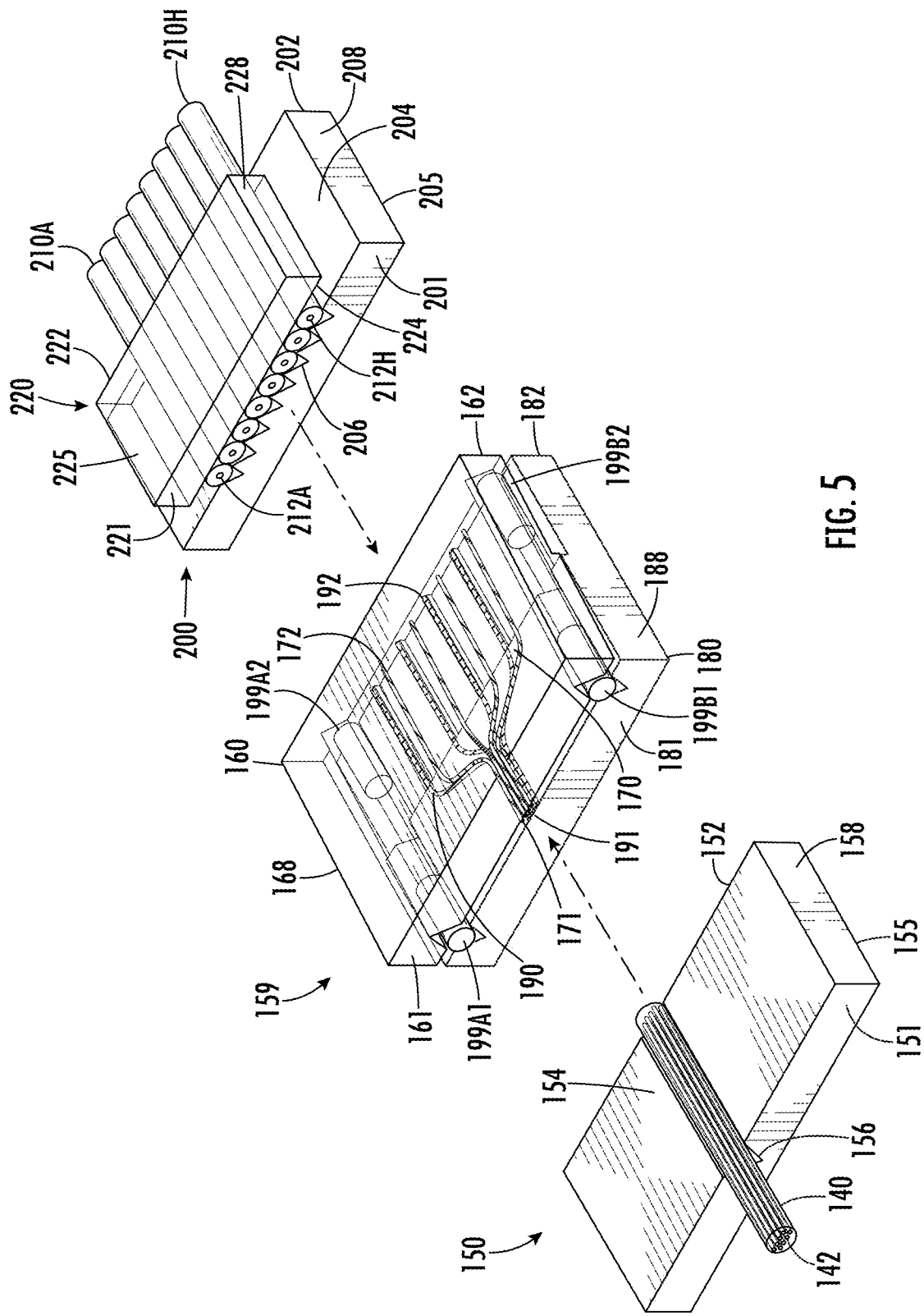
FIG. 5 is a partially exploded perspective view of an optical interconnect system including the optical assembly (e.g., an optical interface assembly) according to FIGS. 4D-4F arranged between (i) a lidless, first fiber array unit (FAU) supporting one multi-core fiber (MCF) having cores arranged in a two-dimensional array and (ii) a lidded, second FAU supporting a plurality of individual (e.g., single-mode) optical fibers arranged in a one-dimensional array corresponding to waveguides of the pluralities of first and second waveguides in an interleaved manner, with the optical fibers having a core pitch that differs from a pitch of cores of the two-dimensional array.

FIG. 5 is a partially exploded perspective view of an optical interconnect system including the optical assembly 159 (e.g., an optical interface assembly) according to FIGS. 4D-4F arranged between (i) a lidless, first FAU 150 supporting one MCF 140 having eight cores 142 arranged in a two-dimensional array, and (ii) a second FAU 200 (having a lid 220) supporting a plurality of individual (e.g., single-mode) optical fibers 210A-210H and corresponding cores 212A-212H arranged in a one-dimensional (e.g., 1×8) array, wherein core pitch and core orientation of the one-dimensional array of the second FAU 200 differ from the core pitch and core orientation of the two-dimensional (e.g., 2×4) array of the first FAU 150. The first FAU 150 may embody a substrate (e.g., of glass or other suitable material) that includes a front (or first) end 151, a rear (or second) end 152, opposing inner and outer faces 154, 155, and sides 158, wherein the MCF 140 is at least partially received in a V-groove 156 defined in the inner face 154. The second FAU 200 may embody a substrate (e.g., of glass or other suitable material) that includes a front (or first) end 201, a rear (or second) end 202, opposing inner and outer faces 204, 205, and sides 208, with an array of V-grooves 206 defined in the inner face 204. Optical fibers 210A-210H are received in the V-grooves 206, wherein proximal ends of the optical fibers 210A-210H are substantially flush with the front end 201, and distal ends of the optical fibers 210A-210H extend beyond the rear end 202 of the second FAU 200. A cover 220 (e.g., of glass or other suitable material) is arranged over the optical fibers 210A-201H, with the cover 220 having a front (or first) end 221, a rear (or second) end 222, opposing inner and outer faces 224, 225, and sides 228. The inner face 224 of the cover 220 is arranged proximate to (and preferably in contact with) the optical fibers 210A-210H to retain the optical fibers 210A-210H in the V-grooves 206. The optical assembly 159 is the same as described in connection with FIGS. 4A-4F, including the first and second PLC members 160, 180 and including peripheral alignment members 199A1, 199B1, 199A2, 199B2 received by peripheral alignment grooves (labeled in FIGS. 4A-4B) of the respective PLC members 160, 180. In the optical assembly 159, the pluralities of first and second waveguides 170, 190 are arranged in first and second planes, respectively, that are non-parallel to one another to facilitate interfacing with a two-dimensional waveguide array at the input ends 161, 181 of the first and second PLC members 160, 180, and to facilitate interfacing with a one-dimensional waveguide array at the output ends 162, 182 of the first and second PLC members 160, 180. It is to be appreciated that each substrate described above may embody a body structure with any suitable layer(s) disclosed herein. When the optical assembly 159 is placed in an abutting relationship with the first and second FAUs 150, 200, optical signals may be transmitted from individual cores 142 of the MCF 140, through waveguides 170, 190 of the optical assembly 159, to individual cores 212A-212H of the second FAU 200, and vice-versa.

In certain embodiments, spacing between waveguides of adjacent PLC members in an optical assembly may be adjusted using precision diameter tubular members (e.g., bare glass fibers) in precisely defined grooves (e.g., V-grooves or U-spaced grooves), wherein the tubular members may also be used to promote lateral alignment between PLC members. Tubular members may be hollow or continuously solid. To facilitate control of vertical spacing between PLC members, the grooves should be fabricated at a precise depth relative to surfaces of the PLC members facing one another. In certain embodiments, grooves (e.g., V-grooves) may be formed by sawing (e.g., diamond) in glass substrates and/or overclad or underclad layers, or grooves (e.g., U-grooves) may be anisotropically etched in silicon substrates. If etching is used for groove formation, the depth can be precisely controlled by stopping the depth at a predetermined time, or by incorporating an etch stop layer to terminate etching at a predefined depth. An etch stop layer can be a silicon or silicon nitride layer deposited on a glass substrate or on a bulk silicon substrate. Cladding material deposited over an etch stop layer or substrate can be removed at a rapid rate, but once the etch stop layer is reached, the etching rate slows considerably, such that stopping the etching upon an etchant reaching the etch stop layer will cause the depth of a U-groove to be well controlled. In one embodiment, a glass substrate may be overlaid with an etch stop layer, an underclad material, and waveguides contained in an overclad layer, and etching may define a U-groove penetrating through an entire depth of sequentially arranged overclad and underclad layers to terminate at the etch stop layer. In certain embodiments, a silicon substrate (which itself serves as an etch stop) may be covered with an underclad layer and waveguides contained in an overclad layer, and etching may define a U-groove penetrating through an entire depth of sequentially arranged overclad and underclad layers to terminate at the silicon substrate. Thicknesses of the underclad layer and the overclad layer may be precisely controlled to avoid undue variation in vertical spacing between waveguides defined in adjacent PLC members. One potential advantage of using U-grooves (with or without etch stops) is that a lateral offset between waveguides of a PLC member and a U-groove etch can be precisely controlled by photolithographic patterning and mask layer alignment.

In certain embodiments, V-grooves may be formed in crystalline materials using anisotropic etching. Examples of substrate materials suitable for being etched in this manner include silicon and $LiNbO_3$. Exposure to chemical etchants preferentially removes material in the direction of specific crystallographic planes, forming precision V-groove features. Examples of wet etchants suitable for use with silicon include KOH (potassium hydroxide), TMAH (tetramethyl ammonium hydroxide (($CH_3$)$_4$NOH), and TMAH:IPA (a combination of TMAH and isopropyl alcohol). Dry anisotropic etching is also possible. For example, $LiNbO_3$ can be anisotropically etched using $SF_6$/Ar in an inductively coupled plasma etching apparatus.

Substrate etching occurs in regions unprotected by an etch-resistant mask layer. Etch mask materials for KOH include silicon nitride, hafnium oxide, PECVD SiC and SiCN, boron-doped Si, PDMS (polydimethylsiloxane), Ni, Mo, and Pt, while etch mask materials for TMAH include $SiO_2$, Al, Ag, Au, and Ta. To prevent excessive mask undercut etching, an etch mask should be well-adhered to a substrate, and a joining interface between a mask and substrate should be free of contamination.

FIG. 6 is a schematic cross-sectional view of an optical interconnect system including an optical assembly 159' having two stacked PLC members 160', 180' with waveguides 170', 190' along non-parallel inner faces (including first and second inner face regions 163', 164' of the first PLC member 160', and first and second inner face regions 183', 184' of the second PLC member 180'). The optical assembly 159' is arranged between (i) a first FAU 150' having a MCF with cores arranged in a two-dimensional array, and (ii) a second FAU 200' supporting a plurality of individual (e.g., single-mode) optical fibers arranged in a one-dimensional array. The first inner face regions 163', 183' are angled apart from one another by a non-zero angle Θ, such that the first inner face regions 163', 183' (and the waveguides 170, 190) are non-parallel relative to one another. The second inner face regions 164', 184' are recessed (and corresponding to reduced thickness areas) relative to the first inner face regions 163', 183' of the PLC members 160', 180', and may be formed by etching or other appropriate methods. In certain embodiments, the second inner face regions 164', 184' comprise step etch regions. In certain embodiments, the second inner face regions 164', 184' comprise a wedge shape that is non-parallel to the corresponding first inner face regions 163', 183'. In certain embodiments, overcladding material 169', 189' (having a thickness t) is arranged between the waveguides 170', 190' and surfaces of the first inner face regions 163, 183, and is absent from the waveguides 170', 190' in the second inner face regions 164, 184. To permit ends of the waveguides 180', 190' to be aligned in a one-dimensional array at output ends 162', 182' of the PLC members 160', 180', the second inner face regions 164', 184' must have a length s that is greater than or equal to the following: two times the length L of the PLC members 160', 180' times the thickness t of the overcladding material 169', 189', divided by a vertical distance Py between ends of the waveguides 170', 190' at the input ends 161', 181' of the PLC members 160', 180'. For example, assuming a PLC member 160', 180' length L of 5 mm, an overcladding layer 169', 189' thickness t of 15 μm, and a waveguide vertical spacing distance Py of 40 μm, the length s of the second inner face regions 164', 184' must be at least 3750 μm.

FIG. 7A is a top plan view of a PLC member 280, with superimposed dashed lines showing positions of waveguides 270 (with waveguide ends 271, 272A-272D) and wall elements 269A-269D of an other PLC member (260 as shown in FIG. 7B) configured to cooperate with the PLC member 280, in order to form an optical assembly according to one embodiment. The PLC member 280 includes an input end 281, an output end 282, and sides 288, wherein a first inner face region 283 extends to the input end 281 and a second inner face region 284 extends to the output end 282. A thickness transition 287 is provided between the first and second inner face regions 283, 284, wherein the first inner face region 283 corresponds to a portion of the PLC member 280 having a greater thickness than a portion of the PLC member 280 corresponding to the second inner face region 284. A first pair of peripheral alignment grooves 286A1, 286B1 extend from the input end 281 toward the thickness transition 287, while a second pair of peripheral alignment grooves 286A2, 286B2 extends from the output end 282 past the thickness transition 287 toward the input end 281, but not so far as to contact the first pair of peripheral alignment grooves 286A1, 286B1. Waveguides 290 arranged in or on the PLC member 280 have first ends 291 arranged at a first pitch at the input end 281, and have second ends 292A-292D arranged at a second (larger) pitch at the output end 282. To maintain the waveguides 290 in a single plane, the waveguides 290 are arranged at a constant surface or depth position in the first inner face region 283, and are supported by wall elements 289A-289D that project upward from the second inner face region 284 and that extend to the output end 282 of the PLC member 280. As shown, the second ends 292A-292D of the waveguides 290 are interleaved with second ends 272A-272D of the waveguides 270 (shown in dashed lines) at the output end 282 of the PLC member 280, wherein the waveguides 290, 270 may form a two-dimensional array proximate to the input end 281, and may form a one-dimensional array proximate to the output end 282.

FIG. 7B is a side elevational view of an optical assembly 259 including the PLC member 280 of FIG. 7A in combination with another PLC member 260. Each PLC member 260, 280 includes an input end 261, 281, an output end 262, 282, a first inner face region 263, 283, and a second inner face region 264, 284, and waveguides that extend from first waveguide ends 271, 291 to second waveguide ends 272, 292. As shown, the first inner face regions 263, 283 correspond to portions of the PLC members 260, 280 having greater thickness than the second inner face regions 264, 284, and the first inner face regions 263, 283 (and waveguides therein) face one another in a non-parallel orientation to permit the optical assembly 259 to form a two-dimensional array of waveguide ends 271, 291 at the input ends 261, 281 of the PLC members 260, 280 and to form a one-dimensional array of waveguide ends 272, 292 at the output ends 262, 282 of the PLC members 280. FIG. 7B shows the first inner face regions 263, 283 of the PLC members 260, 280 as being separated from one another at the input ends 261, 281. To reduce or eliminate the gap between faces of the PLC members 260, 280, at least portions of the inner faces (e.g., at the second inner face regions 264, 284, optionally in combination with the first inner face regions 263, 283) may be processed to form step etch regions and/or wedge shapes.

Various methods and techniques may be used to control orientation (e.g., vertical spacing, lateral alignment, and/or parallel planarity) of PLC members, and/or promote alignment between PLC waveguides and external arrays of fiber cores (e.g., cores of a MCF, or cores of an array of single-mode optical fibers).

FIG. 8A is an exploded side cross-sectional view of a portion of an optical assembly including two glass overclad PLC members 300, 310 in a separated state. Although the PLC members 300, 310 are shown as having constant thickness, it is to be understood that portions thereof (e.g., portions of overcladding layers 305, 315) may be thinned proximate to ends 301B, 311B to permit the PLC members 300, 310 to be oriented in a non-parallel facing relationship. Each PLC member 300, 310 includes waveguides 304, 314 arranged between a substrate 302, 312 and an overcladding layer 305, 315, with the waveguides 304, 314 extending between ends 301A, 301B, 311A, 311B of the PLC members 300, 310. Each substrate 302, 312 and each overcladding layer 305, 315 may be fabricated of glass or another suitable material. Each PLC member 300, 310 has an inner face 306, 316 defined by the overcladding layer 305, 315, and has an opposing outer face 307, 317 defined by the substrate 302, 312. The overcladding layers 305, 315 may have a controlled thickness, which may be controlled by deposition (e.g., by chemical vapor deposition or flame hydrolysis deposition) and/or surface removal (e.g., by mechanical or chemical-mechanical polishing). For each PLC member 300, 310, a distance d between the centers of waveguides 304, 314 and the inner face 306, 316 equals half of the Y-axis pitch (namely, PY/2) between rows of optical fibers in a MCF or rows of fiber cores supported by a FAU (e.g., FAU 200 shown in FIG. 4A). FIG. 8B is a side cross-sectional view showing the optical assembly portion 318 upon assembly, with inner faces 306, 316 of the two PLC members 300, 310 abutting one another at an interface 319, which may include a layer of adhesive material. In the optical assembly portion 318, a vertical distance 2d between the centers of waveguides 304, 314 equals the Y-axis pitch PY suitable for mating with a two-dimensional array of fiber cores. Although the PLC members 300, 310 are shown as being parallel in FIG. 8B, it is to be understood that portions thereof may be thinned proximate to ends 301B, 311B to permit the PLC members 300, 310 to be oriented in a non-parallel facing relationship, in order to interface with an external two-dimensional array of fiber cores at one end, and to interface with an external one-dimensional array of fiber cores at an opposing end. For example, at least portions of the overcladding layers 305, 315 may be processed to form step etch regions and/or wedge shapes.

In certain embodiments, fiducial marks may be provided in or on PLC members and used to control lateral alignment of the PLC members. When fiducial marks are provided, inter-PLC alignment can be carried out using one or more of the following approaches: (1) optical microscope observation on two different PLC members, wherein at least one of the PLC members is substantially transparent; (2) infrared illumination to permit fiducial marks to be viewed through multiple PLC members; (3) utilization of through-hole vias to permit a fiducial mark for one PLC member to be observed through an opening in another PLC member; and (4) separate imaging of PLC member fiducials and utilization of precision stages to allow movement of PLC members to an aligned position.

As an alternative to using fiducial marks, raised features (e.g., defined by photolithographic patterning) or recessed features (e.g., defined by etching) may be provided on inner faces (e.g., substrates or overcladding layers) of adjacent PLC members to promote lateral alignment between PLC members. For example, a raised region formed on a face one a PLC member provide a precise edge that aligns with (and optionally makes contact with) a mating raised alignment feature on another PLC member to provide precise lateral alignment between PLC members during fabrication of an optical assembly. In certain embodiments, raised alignment features may embody overcladding material that is patterned to create a raised boss or mesa, or such features may embody photoresist material that is patterned to an appropriate shape. If heights of raised alignment features are controlled, then can provide both lateral alignment and a desires vertical offset between adjacent PLC members. In certain embodiments, raised alignment features on one PLC member may be configured to mate with one or more alignment recesses (e.g., troughs, depressions, or pits) in an adjacent PLC member. In another example, etched features may be provided on facing features of PLC members to form depressions that may be used to receive one or more alignment elements such as a sphere, rod, or mating post to facilitate alignment between adjacent PLC members.

Figure 9A:
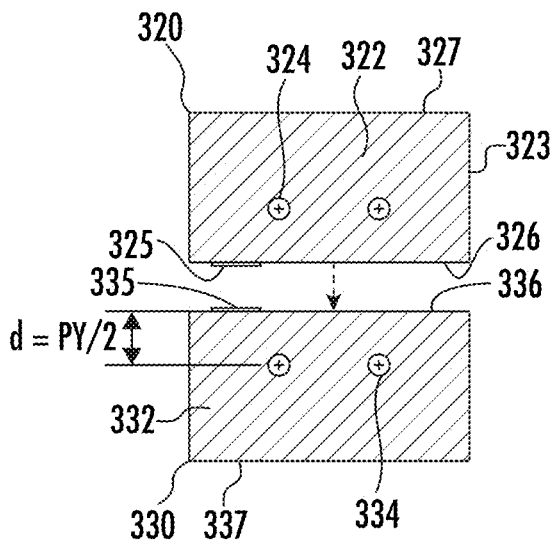
FIG. 9A is an exploded end cross-section view of a portion of an optical assembly including two PLC members having embedded waveguides and fiducial marks for controlling inter-PLC alignment, with the PLC members arranged in a separated state.
Figure 9B:
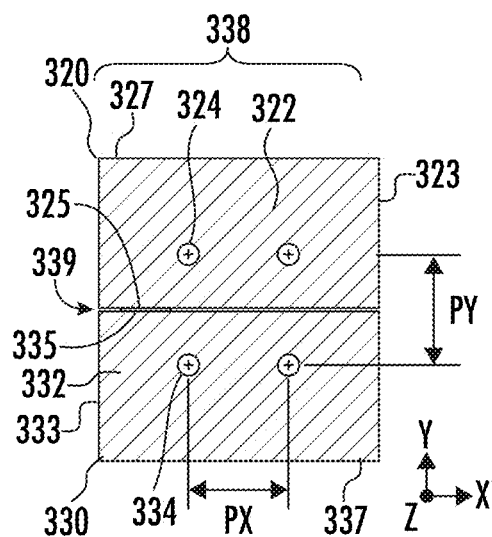
FIG. 9B is an end cross-sectional view showing the optical assembly portion of FIG. 9A with inner faces of the two PLC members abutting one another.

FIG. 9A is an exploded end cross-section view of a portion of an optical assembly including two PLC members 320, 330 having fiducial marks 325, 335 for controlling inter-PLC alignment, with the PLC members 320, 330 arranged in a separated state. Each PLC member 320, 330 includes a substrate 322, 332 with embedded waveguides 324, 334 that extend parallel to sides 323, 333 of the substrate 322, 332, and includes an inner face 326, 336 and an opposing outer face 327, 337. Each fiducial mark 325, 335 is arranged on an inner face 326, 336 of the respective substrate 322, 332, wherein registration between the fiducial marks 325, 335 may be used to promote lateral alignment between the PLC members 320, 330, as shown in FIG. 9B. For each PLC member 320, 330, a distance d between the center of waveguides 324, 334 and the inner face 326, 336 equals half of the Y-axis pitch (namely, PY/2) between rows of optical fibers in a MCF (see FIG. 3). FIG. 9B is a side cross-sectional view showing the optical assembly portion 338 with inner faces 326, 336 of the two PLC members 320, 330 abutting one another at an interface 339 and the fiducial marks 325, 335 being registered with one another, wherein the interface 339 may include a thin layer of adhesive material. In certain embodiments, the fiducial marks 325, 335 can be fabricated on inner faces 326, 336 of the PLC members 320, 330 so that they are photolithographically aligned to the waveguides 324, 334. The fiducial marks 325, 335 can be formed in the same plane (or layer) in which the waveguides 324, 334 are formed, or they can be formed in a separate plane or layer that is precisely aligned to the waveguide 324, 334. In certain embodiments, inner faces 326, 336 of the PLC members 320, 330 contact one other, allowing the fiducial marks 325, 335 to fall in the same plane. In other embodiments, a small vertical separation may be provided between the fiducial marks 325, 335, but the distance may be sufficiently small enough to allow high-precision alignment (e.g., <0.5 µm lateral misalignment) between the PLC members 320, 330. In the optical assembly portion 338, a vertical distance 2d between the waveguides 324, 334 equals the Y-axis pitch PY. Although the PLC members 320, 330 are shown as being parallel in FIG. 9B, it is to be understood that portions thereof may be thinned proximate to one end to permit the PLC members 320, 330 to be oriented in a non-parallel facing relationship, in order to interface with an external two-dimensional array of fiber cores at one end, and to interface with an external one-dimensional array of fiber cores at an opposing end.

In certain embodiments, PLC members may be affixed to one another (e.g., along inner faces thereof) by any suitable methods such as: adhesive bonding, alloy soldering (which entails low temperature and low force requirements), gold-to-gold or copper-to-copper wafer bonding (which entail high temperature and high force requirements), aluminum-to-aluminum wafer bonding (which requires a reducing atmosphere, and entails high temperature and high force requirements), anodic bonding (which entails high temperature, high vacuum, and high voltage requirements), silicon direct bonding (SDB) (which requires an ultra-clean bonding environment), and polymer bonding (which entails low temperature, low force, and high vacuum requirements). If adhesive material is used in locations proximate to waveguides (and particularly deposited dielectric waveguides), then in certain embodiments, the adhesive material may have an index of refraction that is lower than an index of refraction of the adjacent waveguide(s) to ensure that light stays in the waveguides; additionally, an adhesive material may have a low optical absorption to minimize propagation losses in any adjacent waveguides.

Fabrication of alignment grooves (e.g., V-grooves) at a precise offset away from waveguides of a PLC member may be challenging, depending on the substrate type and the V-groove fabrication method. A sawing process is capable of producing multiple V-grooves with precise lateral (X-axis) and vertical (Y-axis) offsets relative to one another. However, precise V-groove alignment relative to pre-existing surface features and edges (e.g., top and bottom faces and sides) on a glass substrate is more difficult. For example, it is more difficult to produce sawed V-grooves at a precise depth relative to a top face of a substrate (or an overclad layer), since glass substrates are not generally fabricated with precise thicknesses, and their thickness can vary with position (e.g., with respect to change in position along the X-axis).

Since it is difficult to a precisely align sawed V-grooves to existing features or alignment marks, sawed V-grooves should be fabricated in a glass substrate prior to PLC waveguides. After V-groove sawing, a photolithographic mask layer can be aligned to visible V-groove features, including: (a) the top edge where a V-groove sidewall meets the top surface of a substrate (note that this edge may have some chipping, but it is possible to define a line that extends along the edge via digital image processing techniques), and (b) the bottom of the V-groove, where the two V-groove sidewalls meet (noting that even if the visible line along the bottom of the V-groove has chipping or roughness, it is possible to define a line along it via digital image processing). Both of the foregoing alignment approaches (a) and (b) have challenges. For top edge alignment, if the substrate thickness varies, the lateral (X-axis) distance to the bottom of the V-groove will also vary, making it difficult to precisely determine the lateral offset distance w required for spacing the V-groove relative to a subsequent PLC waveguide features. Further, for V-groove bottom alignment, the feature is located at the bottom of the V-groove, which may be tens of micrometers below the surface of the glass substrate. This makes the process of accurately determining the lateral offset of the V-groove bottom relative to a subsequent PLC waveguide feature more difficult, as the two datum features (the V-groove bottom and a fiducial or alignment mark on the photolithographic mask that defines the PLC waveguide) lie in different depth focal planes.

One method to address the above-identified challenges in V-groove alignment is to provide a shallow reference V-groove at a precise lateral (i.e., X-axis) offset relative to deeper V-grooves. A reference V-groove only needs to be several micrometers (e.g., 3 to 10 μm) deep—that is, sufficiently deep to produce a clear-V-groove bottom feature across a face of the substrate considering any top face variations and substrate thickness variations. Since a reference V-groove may be shallow, the bottom of the reference V-groove may lie in a plane that is close to a focal plane of fiducial or alignment marks of a photolithographic mask that defines the waveguides of a PLC member produced from the substrate. As a result, a reference V-groove can serve as a precision fiducial or reference for the deeper peripheral V-grooves during fabrication of waveguides on or in the substrate.

In certain embodiments, V-grooves may be formed in crystalline materials using anisotropic etching. Examples of substrate materials suitable for being etched in this manner include silicon and $LiNbO_3$. Exposure to chemical etchants preferentially removes material in the direction of specific crystallographic planes, forming precision V-groove features. Examples of wet etchants suitable for use with silicon include KOH (potassium hydroxide), TMAH (tetramethyl ammonium hydroxide $((CH_3)_4NOH)$, and TMAH:IPA (a combination of TMAH and isopropyl alcohol). Dry anisotropic etching is also possible. For example, $LiNbO_3$ can be anisotropically etched using $SF_6$/Ar in an inductively coupled plasma etching apparatus.

Substrate etching occurs in regions unprotected by an etch-resistant mask layer. Etch mask materials for KOH include silicon nitride, hafnium oxide, PECVD SiC and SiCN, boron-doped Si, PDMS (polydimethylsiloxane), Ni, Mo, and Pt, while etch mask materials for TMAH include $SiO_2$, Al, Ag, Au, and Ta. To prevent excessive mask undercut etching, an etch mask should be well-adhered to a substrate, and a joining interface between a mask and substrate should be free of contamination.

A first process option for forming V-grooves and waveguides in a PLC member includes etching V-grooves before the waveguides are formed. An advantage of this approach is that if V-grooves are fabricated so that they are misaligned or incorrectly sized due to the various distortion conditions (e.g., errors in crystallographic plane orientation relative to a polished surface, spatial variations in etchant concentration within an etch bath, temporal variation in etchant concentration during an etching process, temperature variation of the etchant with respect to time and spatial location, misalignment of an etch mask relative to crystallographic planes of the material to be etched, incorrect shape of an etch mash due to patterning and mask etching variations), then a the PLC waveguide mask step alignment process can compensate and adjust the placement of waveguides in a PLC member. Utilization of a shallow reference V-groove as outlined above can be used to ensure that the reference feature (V-groove bottom) is close to the depth plane of waveguide mask alignment features. One concern is that deep V-grooves can produce challenges in photolithography (e.g., uneven photoresist coverage over profiled surfaces), but in certain embodiments deep features may be filled and planarized by optimizing photoresist spin-on conditions or applying additional temporary planarizing fill layers. Another concern is that fabrication of waveguides in a PLC member may involve deposition of glass underclad and overclad layers into V-groove features unless such features are masked. Glass underclad deposition rates and resulting underclad layer thicknesses may be different on sloped V-groove sidewalls versus flat surfaces in the vicinity of waveguides defined on a PLC member. As a result, the contributions of glass underclad and overclad layer thickness to multi-core fiber PLC substrate spacing will need to be considered if these layers are deposited over the V-grooves. Ion exchange waveguides have an advantage in that they do not require deposition of glass underclad layers or overclad layers A second process option for forming V-grooves and waveguides in a PLC member includes etching V-grooves after the waveguides are formed. Using this approach, etched V-grooves can be precisely aligned to PLC waveguides. Problems with photolithography over non-planar surfaces are avoided, but it may be more difficult to image waveguide locations, especially if they are buried beneath overclad layers. Glass underclad and overclad layers may need to be masked in regions where V-grooves will be etched later, or the underclad and overclad material may need to be removed prior to V-groove etching. The contributions of glass underclad thickness variation will also influence PLC substrate spacing requirements, as the vertical pitch between PLC waveguides will change as the underclad thickness changes.

In certain embodiments, lateral alignment between first and second PLC members may be aided by forming items such as V-grooves and waveguides on or over a single substrate, then dicing (cutting) the substrate and placing (by an operation akin to folding) one cut substrate section over another.

Figure 10A:
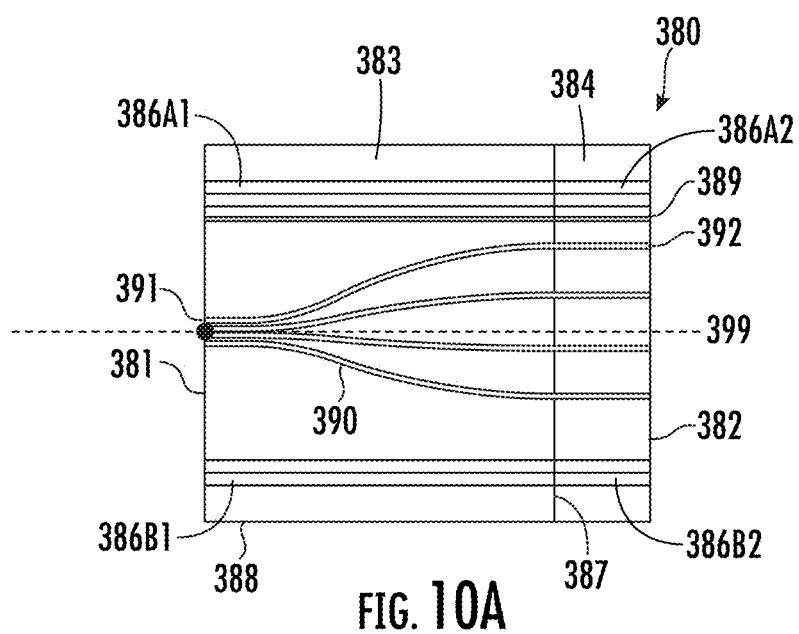
FIG. 10A is a top plan view of a PLC member with a plurality of waveguides and peripheral alignment grooves along an inner face of the PLC member, with the waveguides arranged in a first thickness region of the PLC member proximate to an input end and that is elevated relative to a second thickness region of the PLC member proximate to an output end.

FIG. 10A is a top plan view of a first PLC member 380 defining peripheral V-grooves 386A1, 386B1, 386A2, 386B2, a reference V-groove 389, and a plurality of first waveguides 390 that extend from an input end 381 to an output end 382 of the PLC member 380, wherein each end 381, 382 serves as an optical surface. The PLC member 380 includes a first inner face region 383 that extends to the input end 381 and a second inner face region 384 that extends to the output end 382. A thickness transition 387 is provided between the first and second inner face regions 383, 384, wherein the first inner face region 383 corresponds to a portion of the PLC member 380 having a greater thickness than a portion of the PLC member 380 corresponding to the second inner face region 384. The V-grooves 386A1, 386B1, 386A2, 386B2, 389 are defined in the PLC member 380 and extend parallel to sides 388 of the PLC member 380, with V-grooves 386A1, 386B1 being defined in the first inner face region 383, and with V-grooves 386A2, 386B2 being defined in the second inner face region 383. The plurality of first waveguides 390 includes first ends 391 having a first pitch at the front end 381, and includes second ends 392 having a second, larger pitch at the rear end 382. As shown, a centerline 399 extends through a point centered on the plurality of first waveguides 390 at the front end 381 of the PLC member 380.

Figure 10B:
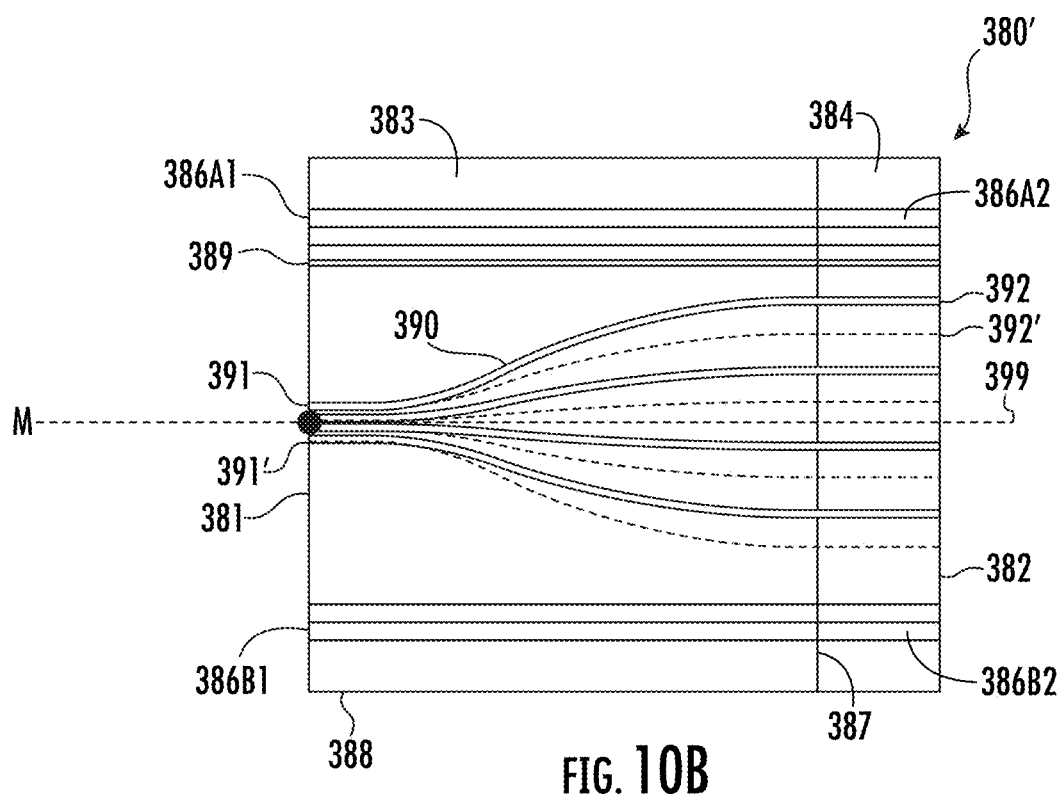
FIG. 10B is a top plan view of the PLC member of FIG. 10A with addition of dashed lines showing hypothetical positions of the waveguides if the PLC member were flipped vertically about a horizontal centerline.

FIG. 10B is a top plan view of a PLC member 380' substantially identical to the PLC member 380 of FIG. 10A, but with addition of dashed lines representing positions of the plurality of first waveguides 390 if the substrate 390 were flipped vertically around the horizontal centerline 399. The dashed lines extend from first ends 391' to second ends 392' that coincide with the input and output ends 381, 382 of the PLC member 380'. As shown, the first ends 391' overlap the first ends 391 of the plurality of first waveguides 390, and the second ends 392' are laterally interspersed with the second ends 392 of a plurality of first waveguides 390. The remaining features of FIG. 10B are identical to those shown and described in connection with the PLC member 380 of FIG. 10A.

Figure 11A:
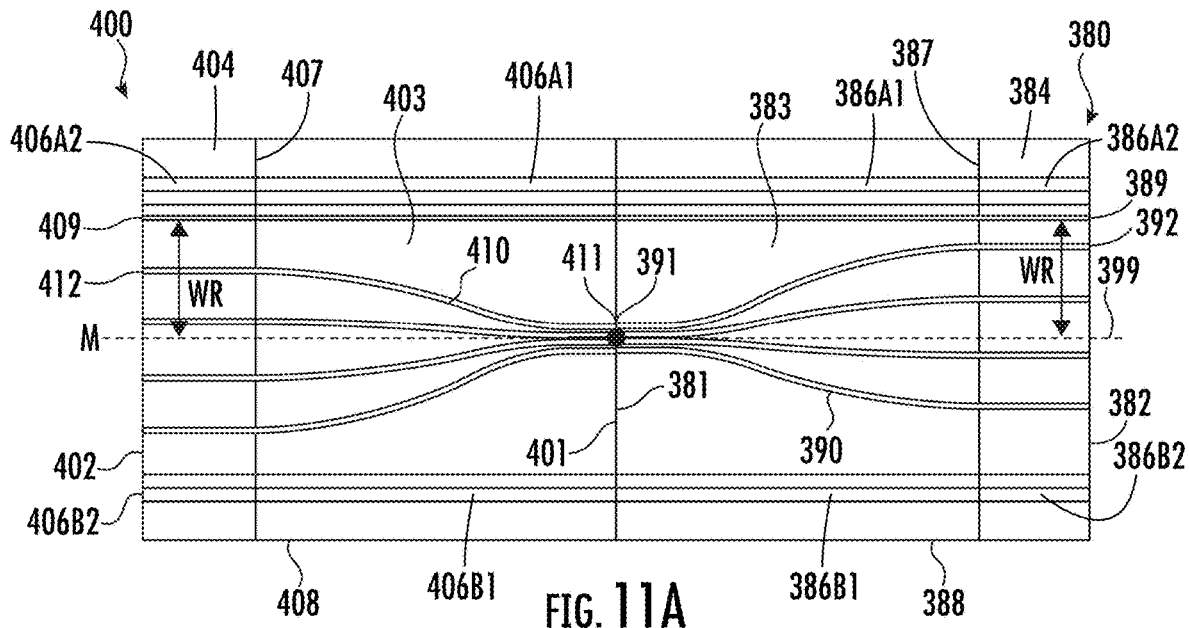
FIG. 11A is a top plan view of first and second PLC members each having alignment grooves and waveguides extending along first and second thickness regions thereof, with the PLC members arranged side-by-side and showing positions of alignment grooves and waveguides of the respective PLC members.

FIG. 11A is a top plan view of first and second PLC members 380, 400 arranged side-by-side, as they could be arranged during fabrication on a single wafer substrate, with the first second PLC members defining a plurality of first waveguides 390, and a plurality of second waveguides 390, 410. Each PLC member 380, 400 has an input end 381, 401, an output end 382, 402, a first inner face region 383, 403, a second inner face region 384, 404, and sides 388, 408. Each PLC member 380, 400 includes a thickness transition 387, 407 provided between the respective first inner face region 383, 403 and the second inner face region 384, 404, wherein the first inner face region 383, 403 corresponds to a portion of the respective PLC member 380, 400 having a greater thickness than a portion of the PLC member 380, 400 corresponding to the second inner face region 384, 404. The first PLC member 380 includes peripheral V-grooves 386A1, 386B1 defined in the first inner face region 383, peripheral V-grooves 386A2, 386B2 defined in the second inner face region 384, and a reference V-groove defined in both inner face regions 383, 384, with all of the foregoing grooves extending parallel to sides 388 of the first PLC member 380. If the first inner face regions 383, 403 and second inner face regions 384, 404 are of the same thickness, then the V-groove pair 386A1, 386A2 may embody a single V-groove, and the V-groove pair 386B1, 386B2 may embody a single V-groove. Similarly, the second PLC member 400 includes peripheral V-grooves 406A1, 406B1 defined in the first inner face region 403, peripheral V-grooves 406A2, 406B2 defined in the second inner face region 404, and a reference V-groove defined in both inner face regions 403, 404, with all of the foregoing grooves extending parallel to sides 408 of the second PLC member 400. The plurality of first waveguides 390 includes first ends 391 at the front end 381 of the first PLC member 380, and includes second ends 392 at the rear end 382 of the first PLC member 380. Similarly, the plurality of second waveguides 410 includes first ends 411 at the front end 401 of the second PLC member 400, and includes second ends 412 at the rear end 402 of the second PLC member 400. The reference V-grooves 389, 409 are separated from the horizontal centerline 399 by a constant distance WR. The first and second PLC members 380, 400 may be fabricated on a single (e.g., glass) body member, and then divided (e.g., diced or cut) to define the front ends 381, 401 separating the substrates 380, 400. Such an approach permits the respective peripheral V-grooves 386A1, 386B1, 386A2, 386B2, 406A1, 406B1, 406A2, 406B2 and the reference V-groove 389, 409 to be aligned, as well as permitting alignment between the first ends 391, 401 of the pluralities of first and second waveguides 390, 400, as well as second ends 392, 412 of the pluralities of first and second waveguides 390, 400.

Figure 11B:
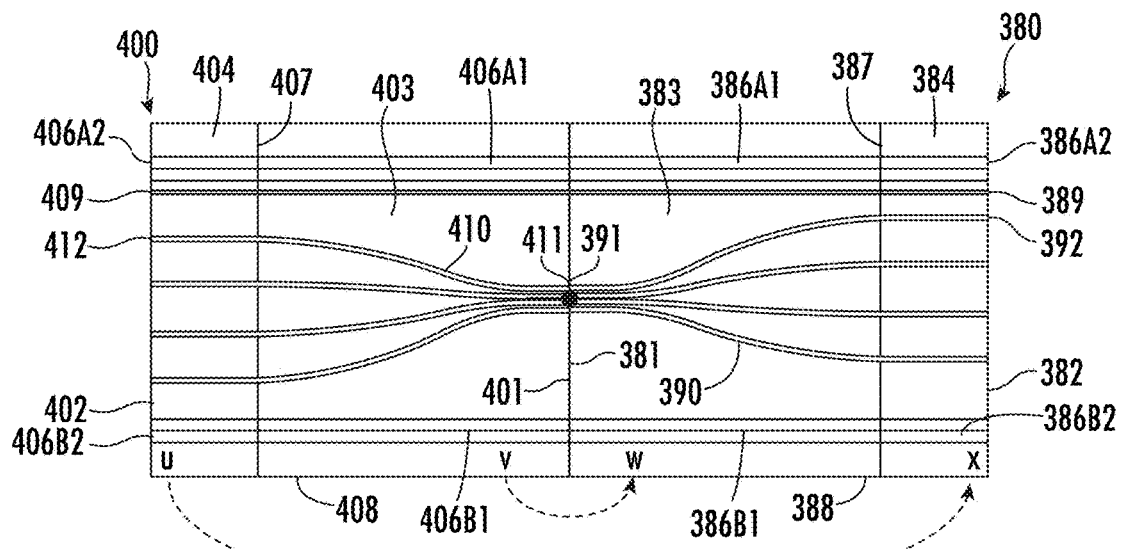
FIG. 11B is a top plan view of the first and second PLC members of FIG. 11A, with superimposed dashed line arrows showing a left-to-right folding pattern for causing the left (second) PLC member to overlie and be stacked over the right (first) PLC member.
Figure 11C:
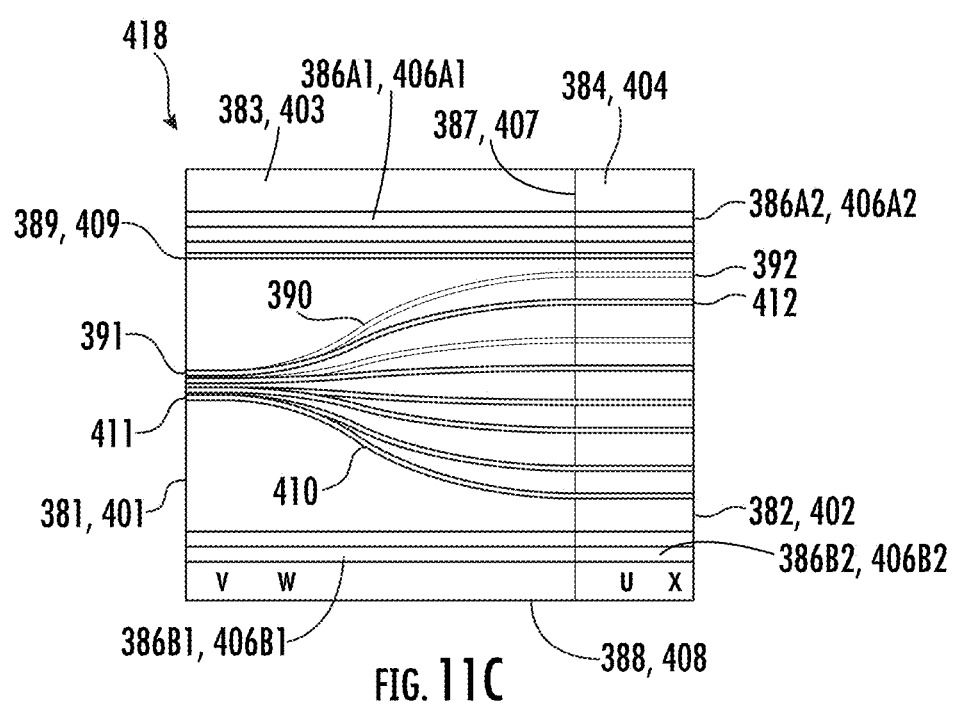
FIG. 11C is a top plan view of the first and second PLC members of FIG. 11B in a stacked configuration after folding according to the left-to-right folding pattern shown in FIG. 11B.

FIG. 11B is a top plan view of the first and second PLC members 380, 401 of FIG. 11A, with superimposed dashed line arrows (from point u to point w, and from point v to point x, respectively) showing a left-to-right folding pattern for causing the left (second) PLC member 400 to overlie and be stacked over the right (first) PLC member 380 (i.e., with the front end of 381 of the first PLC member 380 being registered with the front end 401 of the second PLC member 400. FIG. 11C is a top plan view of the first and second PLC members 380, 400 of FIG. 11B in a stacked configuration (after folding according to the left-to-right folding pattern shown in FIG. 11B) to form an optical assembly 418. As shown, peripheral grooves 386A1, 406A1, 386A2, 406A2 are registered with one another, peripheral grooves 386B1, 406B1, 386B2, 406B2 are registered with one another, and reference grooves 389, 409 are registered with one another. Likewise, first ends 391, 401 of the pluralities of first and second waveguides 390, 410 are registered at the input ends 381, 401 (which serve as optical surfaces) of the PLC members, with the waveguide ends 391, 401 arranged in a two-dimensional array having a small pitch. At the output ends 382, 402 (that serves as another optical surface) of the PLC members, the second ends 392, 402 of the pluralities of first and second waveguides 390, 410 are laterally interspersed with one another in an alternating manner to form a one-dimensional array with a larger pitch, with the first and second waveguides 390, 410 arranged in non-parallel planes, assuming that the second inner face regions 384, 404 comprised reduced thickness regions (e.g., formed by etching) as described previously herein.

In certain embodiments, PLC members can be actively aligned, according to which waveguide locations on upper and lower PLC members end faces may be measured, and then one PLC member is moved relative to the other until the waveguides of the respective PLC members are in a desired orientation. Active alignment may be performed in one dimension, such as laterally (e.g., along the x-axis), or in multiple dimensions (e.g., x, y, and angular z directions). Feedback on waveguide position can be provided by various measurements, such as: (i) optical coupling into MCF cores and single-mode fiber FAUs positioned proximate to respective optical surfaces of an optical assembly; (ii) far field camera measurement of relative waveguide locations subjected to backside illumination (whereby aligning both sides may entail alternating between illuminating a single-mode fiber FAI end face and observing a MCF end face, and vice-versa); (iii) optical microscope observation of stacked waveguide locations from above or below stacked PLC members (e.g., using laser confocal microscopy or laser scanning confocal microscopy), or (iv) interferometric wavefront measurement (e.g., via a Nomarscki microscope or Phasics measurement system (commercially available from Phasics Corp., San Francisco, CA)), whereby two PLC members having associated waveguides are laterally displaced relative to one another until they overlap, producing a maximum value in a measured phase shift). During an active alignment process, adhesive may be displaced in a gap between upper and lower PLC members to allow the PLC members to be aligned.

Figure 12:
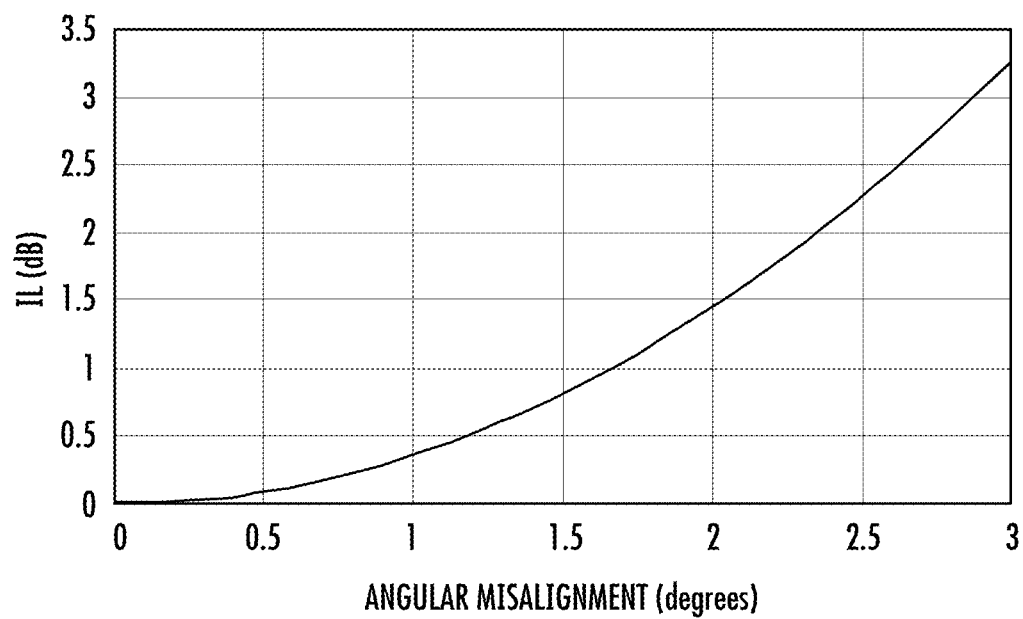
FIG. 12 is a plot of insertion loss (dB) versus angular misalignment (degrees) generated by simulation of two angularly misaligned single-mode optical fibers.
Figure 13:
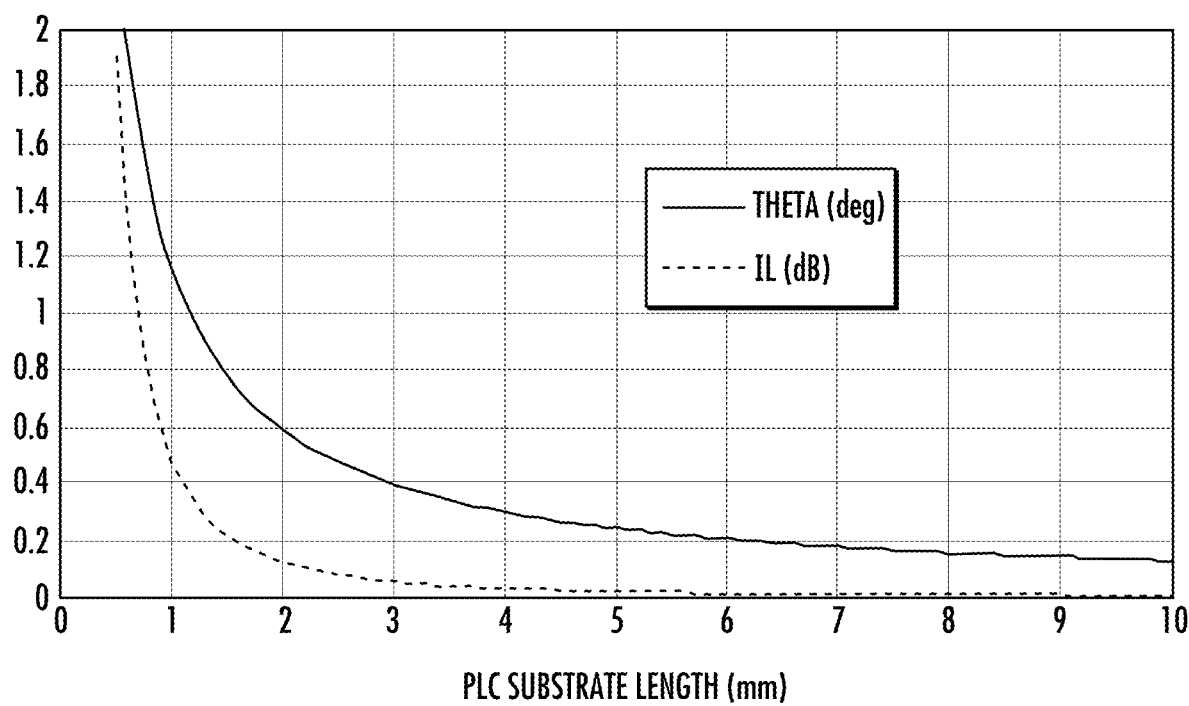
FIG. 13 is a combined plot of angular misalignment (degrees) and insertion loss (dB) versus PLC substrate length (mm) for an optical assembly including two PLC members having waveguides arranged along inner faces thereof, with the waveguides arranged in non-parallel planes.

One potential concern with providing an optical assembly including PLC members with non-parallel faces is that an angled waveguide interface may PLC waveguides and single-mode optical fibers may introduce an unacceptably high insertion loss. FIG. 12 is a plot of insertion loss (dB) versus angular misalignment (degrees) generated by simulation of two angularly misaligned single-mode optical fibers. FIG. 12 shows that insertion loss increase with an increase in angular misalignment, but that an angular misalignment of 2 degrees results in an insertion loss of no more than 1.5 dB, and an angular misalignment of 1 degree results in an insertion loss of less than 0.5 dB. From FIG. 6, the misalignment angle $\Theta$ between waveguides of two non-parallel PLC members equals the tangent of $(-1 \times (P_y/2L))$, where $P_y$ is the vertical pitch and L is the PLC member length. If $P_Y$ equals 40 μm, then the misalignment angle $\Theta$ varies with PLC member length L as shown in FIG. 13 (in the upper curve thereof). Substituting the misalignment angle $\Theta$ into the simulation result for insertion loss in FIG. 12 yields the insertion loss plot (lower curve) in FIG. 13. Thus, FIG. 13 is a combined plot of angular misalignment (degrees) and insertion loss (dB) versus PLC substrate length (mm) for an optical assembly including two PLC members having waveguides arranged along inner faces thereof, with the waveguides arranged in non-parallel planes. The insertion loss plot (lower curve) of FIG. 13 shows that for PLC member lengths greater than 4 to 5 millimeters, the non-parallel (non-zero angled) waveguide interface between first and second PLC members does not significantly contribute to insertion loss of a resulting optical assembly.

Optical assemblies according to various embodiments may be used as fanout assemblies for interfacing two-dimensional arrays of fiber cores having a first pitch to one-dimensional arrays of fiber cores having a second pitch.

Various sequences may be utilized for producing V-grooves, waveguides, and fiducial marks or alignment structures in body structures of PLC members. In certain embodiments, V-grooves may be formed (e.g., by sawing or etching) prior to fabrication of waveguides (e.g., by ion exchange, laser writing, or dielectric deposition). In certain embodiments, waveguides may be formed prior to fabrication of V-grooves. Depending on the materials used and fabrication techniques, fiducial marks or alignment structures marks may be formed either before to or after waveguide fabrication, and either before or after V-grooves are formed.

Those skilled in the art will appreciate that other modifications and variations can be made without departing from the spirit or scope of the invention.

Since modifications, combinations, sub-combinations, and variations of the disclosed embodiments incorporating the spirit and substance of the invention may occur to persons skilled in the art, the invention should be construed to include everything within the scope of the appended claims and their equivalents. The claims as set forth below are incorporated into and constitute part of this detailed description.

It will also be apparent to those skilled in the art that unless otherwise expressly stated, it is in no way intended that any method in this disclosure be construed as requiring that its steps be performed in a specific order. Accordingly, where a method claim below does not actually recite an order to be followed by its steps or it is not otherwise specifically stated in the claims or descriptions that the steps are to be limited to a specific order, it is no way intended that any particular order be inferred. Moreover, where a method claim below does not explicitly recite a step mentioned in the description above, it should not be assumed that the step is required by the claim.

The invention claimed is:

1. An optical assembly comprising:
   a first planar lightwave circuit (PLC) member including a first body structure bounded by a first inner face, a first outer face that opposes the first inner face, a first input end face, and a first output end face that opposes the first input end face, with a plurality of first waveguides defined in or on the first body structure, wherein the plurality of first waveguides extends between the first input end face and the first output end face in a first plane that is parallel to at least a portion of the first inner face; and
   a second PLC member including a second body structure bounded by a second inner face, a second outer face that opposes the second inner face, a second input end face, and a second output end face that opposes the second input end face, with a plurality of second waveguides defined in or on the second body structure, wherein the plurality of second waveguides extends between the second input end face and the second output end face in a second plane that is parallel to at least a portion of the second inner face;
   wherein the first and second PLC members are arranged with the first inner face of the first PLC member facing the second inner face of the second PLC member, and with the second plane being non-parallel to the first plane;
   wherein the first input end face and the second end input end face are positioned such that input ends of the plurality of first waveguides in combination with input ends of the plurality of second waveguides are arranged a two-dimensional array; and
wherein the first output end face and the second output end face are positioned such that output ends of the plurality of first waveguides in combination with output ends of the plurality of second waveguides are arranged in a one-dimensional array.

2. The optical assembly of claim 1, wherein the output ends of the plurality of first waveguides and the output ends of the plurality of second waveguides are alternately arranged in a lateral direction.

3. The optical assembly of claim 1, wherein:
at the first input end face, the first waveguides of the plurality of first waveguides are spaced at a first pitch;
at the second input end face, the second waveguides of the plurality of second waveguides are spaced at the first pitch;
at the first output end face, the first waveguides of the plurality of first waveguides are spaced at a second pitch that is greater than the first pitch; and
at the second output end face, the second waveguides of the plurality of second waveguides are spaced at the second pitch.

4. The optical assembly of claim 1, wherein:
the first input end face and the first output end face are generally orthogonal to the first inner face and the first outer face, and
the second input end face and the second output end face are generally orthogonal to the second inner face and the second outer face.

5. The optical assembly of claim 1, wherein:
the first PLC member comprises a first thickness region proximate to the first input end face, the first PLC member comprises a second thickness region proximate to the first output end face that is reduced in thickness relative to the first thickness region of the first PLC member, and first waveguides of the plurality of first waveguides are elevated relative to the second thickness region of the first PLC member; and
the second PLC member comprises a first thickness region proximate to the second input end face, the second PLC member comprises a second thickness region proximate to the second output end face that is reduced in thickness relative to the first thickness region of the second PLC member, and second waveguides of the plurality of second waveguides are elevated relative to the second thickness region of the second PLC member.

6. The optical assembly of claim 5, wherein:
the first PLC member comprises a plurality of first wall elements extending in a transverse direction from the second thickness region of the first PLC member and elevating the plurality of first waveguides relative to the second thickness region of the first PLC member; and
the second PLC member comprises a plurality of second wall elements extending in a transverse direction from the second thickness region of the second PLC member and elevating the plurality of second waveguides relative to the second thickness region of the second PLC member.

7. The optical assembly of claim 1, wherein:
first peripheral alignment grooves are defined in the first inner face of the first body structure;
second peripheral alignment grooves are defined in the second inner face of the second body structure;
input end tubular alignment members are arranged between pairs of the first and second peripheral alignment grooves proximate to the first input end face and the second input end face; and
output end tubular alignment members are arranged between pairs of the first and second peripheral alignment grooves proximate to the first output end face and the second output end face.

8. The optical assembly of claim 7, further comprising:
a first reference V-groove defined in the first inner face of the first body structure, wherein the first reference V-groove is substantially parallel to, and is shallower than, the first peripheral alignment grooves; and
a second reference V-groove defined in the second inner face of the second body structure, wherein the second reference V-groove is substantially parallel to, and is shallower than, the second peripheral alignment-grooves.

9. The optical assembly of claim 1, wherein:
the plurality of first waveguides comprises a plurality of first ion exchange waveguides or first laser-written waveguides that is recessed relative to at least a portion of the first inner face and is positioned closer to the first inner face than to the first outer face; and
the plurality of second waveguides comprises a plurality of second ion exchange waveguides or second laser-written waveguides that is recessed relative to at least a portion of the second inner face and is positioned closer to the second inner face than to the second outer face.

10. The optical assembly of claim 1, further comprising:
at least one first fiducial mark on the first inner face; and
at least one second fiducial mark on the second inner face;
wherein the at least one second fiducial mark is registered with the at least one first fiducial mark.

11. The optical assembly of claim 1, further comprising adhesive material arranged between the first inner face and the second inner face.

12. The optical assembly of claim 1, further comprising at least one of the following features (i) or (ii):
(i) the first body structure comprises a first substrate and a first overcladding layer, wherein at least portions of first waveguides of the plurality of first waveguides are arranged between the first substrate and the first overcladding layer; or
(ii) the second body structure comprises a second substrate and a second overcladding layer, wherein at least portions of second waveguides of the plurality of second waveguides are arranged between the second substrate and the second overcladding layer.

13. The optical assembly of claim 1, wherein:
the plurality of first waveguides comprises a plurality of deposited dielectric first waveguides positioned closer to the first inner face than the first outer face; and
the plurality of second waveguides comprises a plurality of deposited dielectric second waveguides positioned closer to the second inner face than the second outer face.

14. A method for fabricating an optical assembly, the method comprising:
providing a first planar lightwave circuit (PLC) member including a first body structure bounded by a first inner face, a first outer face that opposes the first inner face, a first input end face, and a first output end face that opposes the first input end face, with a plurality of first waveguides defined in or on the first body structure, wherein the plurality of first waveguides extends between the first input end face and the first output end face in a first plane that is parallel to at least a portion of the first inner face, and wherein first peripheral alignment grooves are defined in the first inner face;

providing a second PLC member including a second body structure bounded by a second inner face, a second outer face that opposes the second inner face, a second input end face, and a second output end face that opposes the second input end face, with a plurality of second waveguides defined in or on the second body structure, wherein the plurality of second waveguides extends between the second input end face and the second output end face in a second plane that is parallel to at least a portion of the second inner face, and wherein second peripheral alignment grooves are defined in the second inner face;

positioning the first and second PLC members with the first inner face of the first PLC member facing the second inner face of the second PLC member, with input end tubular alignment members arranged between pairs of the first and second alignment grooves proximate to the first input end face and the second input end face, and with output end tubular alignment members arranged between pairs of the first and second peripheral alignment grooves proximate to the first output end face and the second output end face; and securing the first and second PLC members around the input end tubular alignment members and the output end alignment members to cause: (i) the second plane to be non-parallel to the first plane, (ii) the first input end face and the second input end face to be positioned such that input ends of the plurality of first waveguides in combination with input ends of the plurality of second waveguides being arranged a two-dimensional array, and (iii) the first output end face and the second output end face to be positioned such that output ends of the plurality of first waveguides in combination with output ends of the plurality of second waveguides being arranged a one-dimensional array.

15. The method of claim 14, wherein the output ends of the plurality of first waveguides and the output ends of the plurality of second waveguides are alternately arranged in a lateral direction.

16. The method of claim 14, wherein:
at the first input end face, the first waveguides of the plurality of first waveguides are spaced at a first pitch;
at the second input end face, the second waveguides of the plurality of second waveguides are spaced at the first pitch;
at the first output end face, the first waveguides of the plurality of first waveguides are spaced at a second pitch that is greater than the first pitch; and
at the second output end face, the second waveguides of the plurality of second waveguides are spaced at the second pitch.

17. The method of claim 14, wherein the first PLC member comprises a first thickness region proximate to the first end face, the second PLC member comprises a first thickness region proximate to the send end face, and the method further comprises:
thinning a portion of the first PLC member to cause the first PLC member to include a second thickness region proximate to the first output end face that is reduced in thickness relative to the first thickness region of the first PLC member, and to cause first waveguides of the plurality of first waveguides to be elevated relative to the second thickness region of the first PLC member; and thinning a portion of the second PLC member to cause the second PLC member to include a second thickness region proximate to the second output end face that is reduced in thickness relative to the first thickness region of the second PLC member, and to cause second waveguides of the plurality of second waveguides to be elevated relative to the second thickness region of the second PLC member.

18. The method of claim 14, wherein:
thinning of the portion of the first PLC member comprises etching the first PLC member to yield the second thickness region of the first PLC member, with a plurality of first wall elements extending in a transverse direction from the second thickness region of the first PLC member and elevating the plurality of first waveguides relative to the second thickness region of the first PLC member; and thinning of the portion of the second PLC member comprises etching the second PLC member to yield the second thickness region of the second PLC member, with a plurality of second wall elements extending in a transverse direction from the second thickness region of the second PLC member and elevating the plurality of second waveguides relative to the second thickness region of the second PLC member.

19. The method of claim 14, further comprising:
defining a first reference V-groove in the first inner face of the first body structure, wherein the first reference V-groove is substantially parallel to, and is shallower than, the first peripheral alignment grooves; and defining a second reference V-groove in the second inner face of the second body structure, wherein the second reference V-groove is substantially parallel to, and is shallower than, the second peripheral alignment-grooves.

20. The method of claim 14, wherein:
the providing of the first PLC member comprises defining the plurality of first waveguides by ion exchange or by laser processing, to cause the plurality of first waveguides to be recessed relative to the first inner face and to be positioned closer to the first inner face than to the first outer face; and the providing of the second PLC member comprises defining the plurality of second waveguides by ion exchange or by laser processing, to cause the plurality of second waveguides to be recessed relative to the second inner face and to be positioned closer to the second inner face than to the second outer face.

21. The method of claim 14, wherein the securing of the first and second PLC members around the input end tubular alignment members and the output end alignment members comprising providing an adhesive between at least portions of the first and second PLC members.

22. The method of claim 14, wherein:
the first input end face and the first output end face are generally orthogonal to the first inner face and the first outer face, and the second input end face and the second output end face are generally orthogonal to the second inner face and the second outer face.

23. The method of claim 22, wherein the first input end face and the second input end face in combination define an input optical surface, the first output end face and the second output end face in combination define an output optical surface, and the method further comprises:
  polishing the input optical surface; and
  polishing the output optical surface.

* * * * *